United States Patent [19]

Amano et al.

[11] Patent Number: 5,672,672

[45] Date of Patent: Sep. 30, 1997

[54] POLYMERIC OPTICAL MIXTURES, POLYMERIC OPTICAL MATERIALS AND POLYMERIC OPTICAL WAVEGUIDE

[75] Inventors: Michiyuki Amano, Funabashi; Toshio Watanabe, Mito; Mitsuo Usui, Tokyo; Shungo Sugawara, Mito; Shoichi Hayashida, Hitachinaka; Saburo Imamura, Mito, all of Japan

[73] Assignee: Nippon Telegraph and Telephone Corporation, Tokyo, Japan

[21] Appl. No.: 548,451

[22] Filed: Oct. 26, 1995

[30] Foreign Application Priority Data

Oct. 26, 1994 [JP] Japan ................................ 6-284530
Mar. 20, 1995 [JP] Japan ................................ 7-085979

[51] Int. Cl.⁶ .................................................. C08G 77/06
[52] U.S. Cl. .......................... 528/16; 528/17; 522/99; 522/172; 385/143; 385/145
[58] Field of Search ............................... 385/143, 145; 528/16, 17; 522/99, 172

[56] References Cited

U.S. PATENT DOCUMENTS

| | | |
|---|---|---|
| 3,779,986 | 12/1973 | Smith. |
| 4,417,782 | 11/1983 | Clarke et al. ........................ 385/126 |
| 4,433,127 | 2/1984 | Sugiyama et al.. |
| 4,835,057 | 5/1989 | Bagley et al. ....................... 385/145 |
| 5,062,680 | 11/1991 | Imamura et al. ................... 385/145 |
| 5,307,438 | 4/1994 | Bilkadi et al. ...................... 385/15 |

FOREIGN PATENT DOCUMENTS

| | | |
|---|---|---|
| 164470 | 12/1985 | European Pat. Off.. |
| 831292 | 2/1952 | Germany. |
| 4034428 | 5/1991 | Germany. |
| 1473335 | 5/1977 | United Kingdom. |

OTHER PUBLICATIONS

Nippon Telegr & Telegraph Corp, JP 03043423, Feb. 25, 1991, *Patent Abstracts of Japan*, vol. 15, No. 177, (C–0829), Abstract.

*Primary Examiner*—Melvyn I. Marquis
*Attorney, Agent, or Firm*—Spencer & Frank

[57] ABSTRACT

A polymeric optical material which is a mixture of a polysiloxane and at least one compound selected from the group consisting of polyisocyanate, silane, alkoxide and chelate, and an optical waveguide fabricated from the polymeric optical material having high thermal stability and low propagation loss over wide range. The polysiloxane may have, for example, a repeating unit of following formula (I):

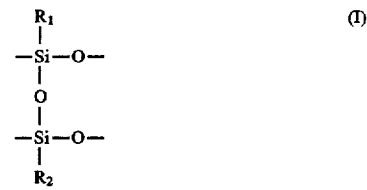

wherein each of $R_1$ and $R_2$ is independently an alkyl, deuterated alkyl or halogenated alkyl group, or a phenyl, deuterated phenyl or halogenated phenyl group. The optical waveguide includes a substrate, a clad layer provided on the substrate and a core layer surrounded by the clad layer. The clad layer is composed of a lower clad layer which is overlaid onto the substrate and an upper clad layer which surrounds the core layer.

32 Claims, 2 Drawing Sheets

POLYMERIC OPTICAL MIXTURES, POLYMERIC OPTICAL MATERIALS AND POLYMERIC OPTICAL WAVEGUIDE

BACKGROUND OF THE INVENTION

1. Field of the Invention

The present invention relates to optical mixtures, optical materials made from the optical mixtures and optical waveguide comprising the optical materials useful as optical components, optical integrated circuits and optical circuit board in the field of optics, microoptics, optical communications or optical information processing.

2. Description of Related Art

Polymeric materials are easily converted to bulks or films by various methods such as spin-coating, dipping, thermocuring, and photocuring. These bulks and films are generally flexible and tough, and also they may be applied to microprocessing by photolithography, etching, stamping or photoimaging.

The physical properties such as optical, thermal and mechanical properties of the polymeric materials are controlled in a wide range by changing or adjusting the chemical structure of the polymeric materials. Therefore, in the case when polymeric materials are utilized as an optical waveguide, it is expected that optical waveguides can be fabricated at low temperatures (because low temperatures are favorable to simultaneously provide the semiconductor device) and the resultant optical waveguides are flexible and tough as compared to inorganic glass materials such as silica glass or inorganic crystalline materials.

Japanese Patent Application Laying-open No. 52-57295 discloses a method for the preparation of polyurethane by reacting a polysiloxane-oxyalkylene block copolymer having a hydroxyl group with an organic polyisocyanate.

Polymeric optical materials to be used in the field of optical communications and optical information processing are also known. Examples of such polymeric optical materials include a polysiloxane whose side chains are replaced with the substituents by hydroxylation in order to control the refractive index of the resultant optical waveguide (Japanese Patent Application Laying-open No. 61-275706) and a polyorganosilsesquioxane-based polysiloxane with hydrogens being substituted partly or entirely with deuterium in order to improve the thermal stability and optical transparency in the wavelength region useful for communications (infra-red region) (Japanese Patent Application Laying-open Nos. 3-43423 and 6-172533).

Furthermore, fabrication of single-mode channel waveguides with the deuterated or halogenated polysiloxane was also reported [ELECTRONICS LETTERS 9th, June 1994, vol. 30, No. 12, pp. 958–959; Japanese Patent Application Laying-open No. 6-172533; TECHNICAL REPORT OF IEICE. OME94-47 (1994-09)].

However, such polysiloxane-based optical waveguides, which have a core/clad structure, suffer a problem of intermixing attributable to low solvent resistance of the polysiloxane itself. The term "intermixing" generally means that when a polymer layer is coated upon another polymer layer, the surface of the first or lower layer is dissolved in a coating composition for forming the second or upper layer, so that the interface between the two layers becomes unclear or irregular.

For instance, when a core layer is coated on a lower clad layer, a part of the lower clad layer is dissolved in a coating composition for forming the core layer, and a clear core/clad interface is not formed (FIG. 1).

Because of the intermixing, the refractive index difference between the core and the clad of a core/clad structure in an optical waveguide (in general, within several %, determined depending on the type of mode of optical waveguide) tends to vary from place to place, with the result that the refractive index of an optical waveguide cannot be controlled precisely enough to match the designed value. A precise control of refractive index is essential in utilizing optical elements in the field of, for example, optical coupling using plural optical waveguides, more specifically directional couplers. In this point of view, existing type of polymeric optical waveguide having the above mentioned problem cannot be used successfully.

Also, the fabricated polymeric waveguides tend to have insufficient environmental resistance and their properties change rather quickly with time. The reproducibility of the waveguide is not so high. Furthermore, a problem arises that fabricated polymeric optical waveguides tend to be smaller than the designed size because of intermixing. These problems are very difficult obstacles to overcome in the fabrication of precise optical elements including directional couplers. In order to avoid such an intermixing and to fabricate desirable optical waveguides having a refractive index of the initially designed value, it is necessary to provide a layer which is insoluble in solvents and has a thickness considerably smaller than the wavelength of light to be used (e.g., one severalth of the wavelength). Actually, a fabricating process for providing such a layer is very complex and not usable practically.

SUMMARY OF THE INVENTION

The present invention provides an optical material comprising a polysiloxane which has solvent resistance to avoid the above mentioned intermixing, low propagation loss in the range from the visible light region to the infra-red region, and high thermal stability, and also provide an optical waveguide which has desirable optical properties such as refractive index.

(1) In a first aspect of the present invention, there is provided a polymeric optical material comprising a mixture of a polysiloxane with a crosslinking agent.

(2) In the polymeric optical material as mentioned in the item (1) above, the crosslinking agent may comprise at least one member selected from the group consisting of a polyisocyanate, a silane compound, a titanium alkoxide, a titanium chelate compound, an aluminum alkoxide, an aluminum chelate compound, a zirconium alkoxide and a zirconium chelate compound.

(3) In the polymeric optical material as mentioned in the item (1) above, the polysiloxane may comprise a repeating unit represented by following formula (I):

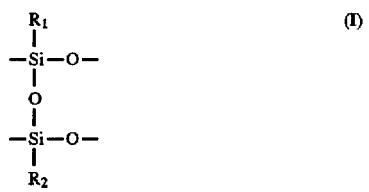

wherein each of $R_1$ and $R_2$ is independently an alkyl, deuterated alkyl or halogenated alkyl group, or a phenyl, deuterated phenyl or halogenated phenyl group.

(4) In the polymeric optical material as mentioned in the item (2) above, the polysiloxane may comprise a repeating unit represented by following formula (I):

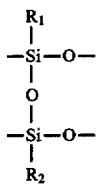  (I)

wherein each of $R_1$ and $R_2$ is independently an alkyl, deuterated alkyl or halogenated alkyl group, or a phenyl, deuterated phenyl or halogenated phenyl group.

(5) In the polymeric optical material as mentioned in the item (1) above, the polysiloxane may contain a hydroxyl group in its molecule.

(6) In the polymeric optical material as mentioned in the item (2) above, the polysiloxane may contain a hydroxyl group in its molecule.

(7) In the polymeric optical material as mentioned in the item (1) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively.

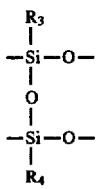 (II-1)

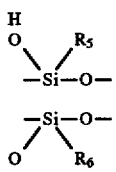 (II-2)

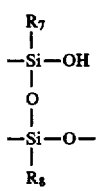 (II-3)

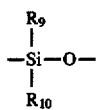 (II-4)

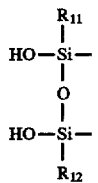 (II-5)

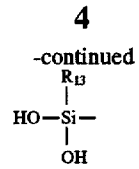 (II-6)

wherein each of $R_3$ to $R_{13}$ is independently an alkyl, deuterated alkyl or halogenated alkyl group, or a phenyl, deuterated phenyl or halogenated phenyl group.

(8) In the polymeric optical material as mentioned in the item (2) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively.

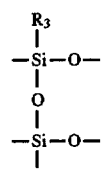 (II-1)

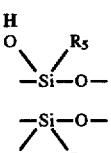 (II-2)

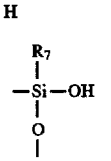 (II-3)

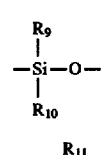 (II-4)

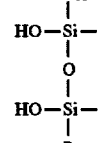 (II-5)

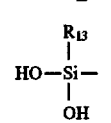 (II-6)

wherein each of $R_3$ to $R_{13}$ is independently an alkyl, deuterated alkyl or halogenated alkyl group, or a phenyl, deuterated phenyl or halogenated phenyl group.

(9) In the polymeric optical material as mentioned in the item (1) above, the polysiloxane may comprise a repeating unit represented by following formula (I):

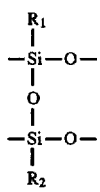

$$\begin{array}{c} R_1 \\ | \\ -Si-O- \\ | \\ O \\ | \\ -Si-O- \\ | \\ R_2 \end{array} \quad (I)$$

wherein each of $R_1$ and $R_2$ is independently an alkyl, deuterated alkyl or halogenated alkyl group, or phenyl, deuterated phenyl or halogenated phenyl group; and the crosslinking agent may be a compound containing at least two of the functional group —Si—N═C═O in and the crosslinking agent may be a compound containing at least two of the functional group of —Si—N═C═O in its molecule.

(10) In the polymeric optical material as mentioned in the item (1) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively:

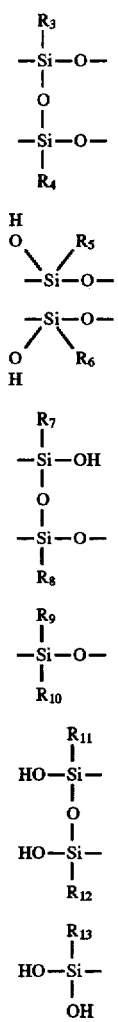

wherein each of $R_3$ to $R_{13}$ is independently an alkyl, deuterated alkyl or halogenated alkyl group, or a phenyl, deuterated phenyl or halogenated phenyl group;

and the crosslinking agent may be a compound containing at least two of the functional group of —Si—N═C═O in its molecule.

(11) In the second aspect of the present invention, there is also provided a polymeric optical material comprising a polysiloxane having a repeating unit represented by following formula (III):

wherein each of $R_{14}$ and $R_{15}$ is independently an alkyl, deuterated alkyl or halogenated alkyl group, an alkenyl, deuterated alkenyl or halogenated alkenyl group, or a phenyl, deuterated phenyl or halogenated phenyl group; with the proviso that at least one of $R_{14}$ and $R_{15}$ is an alkyl, deuterated alkyl or halogenated alkyl group, or an alkenyl, deuterated alkenyl or halogenated alkenyl group.

(12) In the polymeric optical material as mentioned in the item (11) adore, it may contain an organic peroxide.

(13) In the polymeric optical material as mentioned in the item (11) above, it may be prepared by crosslinking any of the alkyl, deuterated alkyl or halogenated alkyl group, or an alkenyl, deuterated alkenyl or halogenated alkenyl group.

(14) In the third aspect of the present invention, there is provided a polymeric optical waveguide having a core and a clad surrounding the core, the core or clad comprising a polymeric optical material prepared by curing a mixture of a polysiloxane with a crosslinking agent.

(15) In the polymeric optical waveguide as mentioned in the item (14) above, it may further comprise a substrate having the clad thereon.

(16) In the polymeric optical waveguide as mentioned in the item (14) above, the crosslinking agent may comprise at least one member selected from the group consisting of a polyisocyanate, a silane compound, a titanium alkoxide, a titanium chelate compound, an aluminum alkoxide, an aluminum chelate compound, a zirconium alkoxide and a zirconium chelate compound.

(17) In the polymeric optical waveguide as mentioned in the item (16) above, it may further comprise a substrate having the clad thereon.

(18) In the polymeric optical waveguide as mentioned in the item (14), the polysiloxane may comprise a repeating unit represented by following formula (I):

wherein each of $R_1$ and $R_2$ is independently an alkyl, deuterated alkyl or halogenated alkyl group, or a phenyl, deuterated phenyl or halogenated phenyl group.

(19) In the polymeric optical waveguide as mentioned in the item (18) above, it may further comprise a substrate having the clad thereon.

(20) In the polymeric optical waveguide as mentioned in the item (14) above, the polysiloxane may comprise a repeating unit represented by following formula (I):

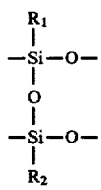

wherein each of $R_1$ and $R_2$ is independently an alkyl, deuterated alkyl or halogenated alkyl group, or a phenyl, deuterated phenyl or halogenated phenyl group;

and the crosslinking agent may comprise at least one member selected from the group consisting of a polyisocyanate, a silane compound, a titanium alkoxide, a titanium chelate compound, an aluminum alkoxide, an aluminum chelate compound, a zirconium alkoxide and a zirconium chelate compound

(21) In the polymeric optical waveguide as mentioned in the item (20) above, it may further comprise a substrate having the clad thereon.

(22) In the polymeric optical waveguide as mentioned in the item (14) above, the polysiloxane may contain a hydroxyl group in its molecule.

(23) In the polymeric optical waveguide as mentioned in the item (22) above, it may further comprise a substrate having the clad thereon.

(24) In the polymeric optical waveguide as mentioned in the item (14) above, the polysiloxane may contain a hydroxyl group in its molecule and the crosslinking agent comprises at least one member selected from the group consisting of a polyisocyanate, a silane compound, a titanium alkoxide, a titanium chelate compound, an aluminum alkoxide, an aluminum chelate compound, a zirconium alkoxide and a zirconium chelate compound.

(25) In the polymeric optical waveguide as mentioned in the item (24) above, it may further comprise a substrate having the clad thereon.

(26) In the polymeric optical waveguide as mentioned in the item (14) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively.

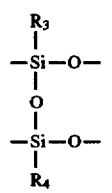

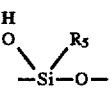

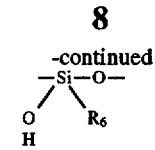

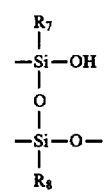

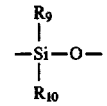

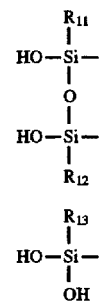

wherein each of $R_3$ to $R_{13}$ is independently an alkyl, deuterated alkyl or halogenated alkyl group, or a phenyl, deuterated phenyl or halogenated phenyl group.

(27) In the polymeric optical waveguide as mentioned in the item (26) above, it may further comprise a substrate having the clad thereon.

(28) In the polymeric optical waveguide as mentioned in the item (14) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively.

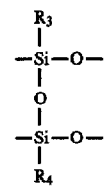

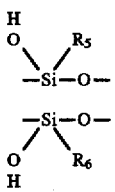

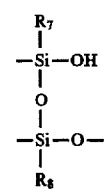

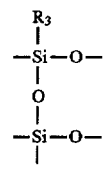

$$\begin{array}{c} R_3 \\ | \\ -Si-O- \\ | \\ O \\ | \\ -Si-O- \\ | \\ R_4 \end{array} \quad \text{(II-1)}$$

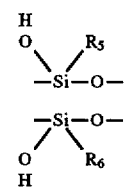

$$\text{(II-2)}$$

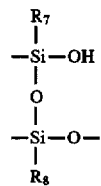

$$\begin{array}{c} R_7 \\ | \\ -Si-OH \\ | \\ O \\ | \\ -Si-O- \\ | \\ R_8 \end{array} \quad \text{(II-3)}$$

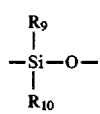

$$\begin{array}{c} R_9 \\ | \\ -Si-O- \\ | \\ R_{10} \end{array} \quad \text{(II-4)}$$

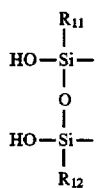

$$\begin{array}{c} R_{11} \\ | \\ HO-Si- \\ | \\ O \\ | \\ HO-Si- \\ | \\ R_{12} \end{array} \quad \text{(II-5)}$$

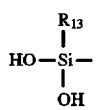

$$\begin{array}{c} R_{13} \\ | \\ HO-Si- \\ | \\ OH \end{array} \quad \text{(II-6)}$$

wherein each of $R_3$ to $R_{13}$ is independently an alkyl, deuterated alkyl or halogenated alkyl group, or a phenyl, deuterated phenyl or halogenated phenyl group;

and the crosslinking agent may comprise at least one member selected from the group consisting of a polyisocyanate, a silane compound, a titanium alkoxide, a titanium chelate compound, an aluminum alkoxide, an aluminum chelate compound, a zirconium alkoxide and a zirconium chelate compound.

(29) In the polymeric optical waveguide as mentioned in the item (28) above, it may further comprise a substrate having the clad thereon.

(30) In the polymeric optical waveguide as mentioned in the item (14) above, the polysiloxane may comprise a repeating unit represented by following formula (I):

$$\begin{array}{c} R_1 \\ | \\ -Si-O- \\ | \\ O \\ | \\ -Si-O- \\ | \\ R_2 \end{array} \quad \text{(I)}$$

wherein each of $R_1$ and $R_2$ As independently an alkyl, deuterated alkyl or halogenated alkyl group, or a phenyl, deuterated phenyl or halogenated phenyl group;

and the crosslinking agent may be a compound containing at least two of the functional group of —Si—N=C=O in its molecule.

(31) In the polymeric optical waveguide as mentioned in the item (30) above, it may further comprise a substrate having the clad thereon.

(32) In the polymeric optical waveguide as mentioned in the item (14) above, the polysiloxane may be a silicon-containing compound comprising at least one unit selected from the group consisting of units A, B, C and D represented by following formulae (II-1) to (II-4), respectively, and at least one unit selected from the group consisting of units E and F represented by following formulae (II-5) and (II-6), respectively:

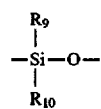

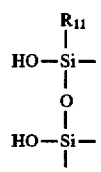

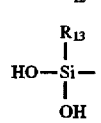

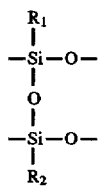

wherein each of $R_3$ to $R_{13}$ is independently an alkyl, deuterated alkyl or halogenated alkyl group, or a phenyl, deuterated phenyl or halogenated phenyl group;

and the crosslinking agent may be a compound containing at least two of the functional group of —Si—N=C=O in its molecule.

(33) In the polymeric optical waveguide as mentioned in the item (32) above, it may further comprise a substrate having the clad thereon.

(34) In the fourth aspect of the present invention, there is provided a polymeric optical waveguide comprising a polysiloxane having a repeating unit represented by following formula (III):

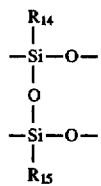

$$\begin{array}{c} R_{14} \\ | \\ -Si-O- \\ | \\ O \\ | \\ -Si-O- \\ | \\ R_{15} \end{array} \quad \text{(III)}$$

wherein each of $R_{14}$ and $R_{15}$ is independently an alkyl, deuterated alkyl or halogenated alkyl group, an alkenyl, deuterated alkenyl or halogenated alkenyl group, or a phenyl, deuterated phenyl or halogenated phenyl group; with the proviso that at least one of $R_{14}$ and $R_{15}$ is an alkyl, deuterated alkyl or halogenated alkyl group, or an alkenyl, deuterated alkenyl or halogenated alkenyl group.

(35) In the polymeric optical waveguide as mentioned in the item (34) above, it may further comprise a substrate having the clad thereon.

(36) In the polymeric optical waveguide as mentioned in the item (34) above, it may contain an organic peroxide.

(37) In the polymeric optical waveguide as mentioned in the item (36) above, it may further comprise a substrate having the clad thereon.

(38) In the polymeric optical waveguide as mentioned in the item (34) above, it may be prepared by crosslinking any of the alkyl, deuterated alkyl or halogenated alkyl group, or an alkenyl, deuterated alkenyl or halogenated alkenyl group.

(39) In the polymeric optical waveguide as mentioned in the item (38) above, which further comprises a substrate having the clad thereon.

The present invention can provide a polysiloxane which is insoluble in any solvent and has a high thermal stability. Also the polysiloxane has propagation loss over a wide range of wavelength (see Table 1) and improved polarization dependency. Consequently, the occurrence of intermixing can be prevented when fabricating various optical components (see FIG. 2) such that they can be fabricate easily. The optical materials of the present invention are applied more specifically to optical waveguide, for example, a directional coupler as shown in FIG. 3 because of their high thermal stability and low propagation loss. Therefore, the present invention can be applied to the field of optics, optical communications such as optical fiber and optical information processing The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
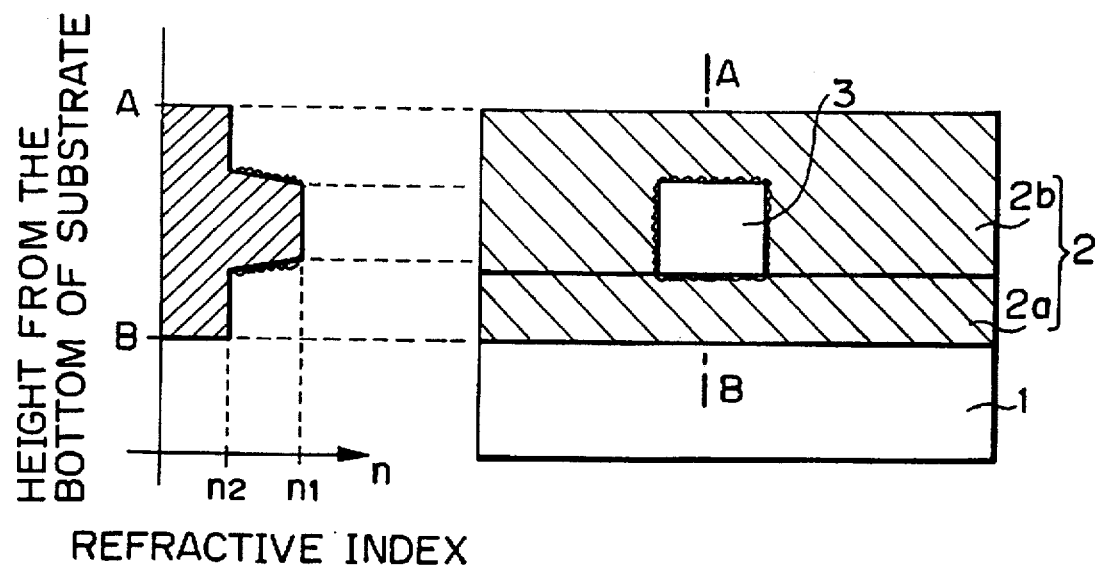
FIG. 1 is a schematic cross-sectional view showing a conventional polymeric optical waveguide.

The polymeric optical material of the present invention comprises a mixture of a polysiloxane with a crosslinking agent.

In the present invention, the polysiloxane preferably comprises a repeating unit represented by following formula (I):

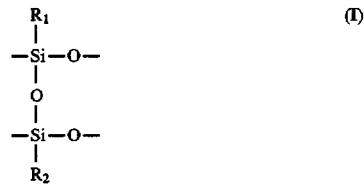

wherein each of $R_1$ and $R_2$ is independently an alkyl, deuterated alkyl or halogenated alkyl group, or a phenyl, deuterated phenyl or halogenated phenyl group.

The crosslinking agent to be used in the present invention is at least one member selected from the group consisting of a polyisocyanate, a silane compound, an alkoxide selected from the group consisting of a titanium alkoxide, an aluminum alkoxide, and a zirconium alkoxide, and a chelate compound selected from the group consisting of a titanium chelate compound, an aluminum chelate compound, and a zirconium chelate compound.

The optical material or mixture of the present invention may include, in addition to the polysiloxane and the crosslinking agent, one or more other components such as a solvent, a catalyst and the like.

In the polysiloxane comprising the repeating unit of the formula (I) above [hereinafter, simply referred to as "polysiloxane (or compound) (I)], the degree of the polymerization n is not specifically limited. However, in case of the oligomer having about a polymerization degree of n=ca. 1-10, the mixture of the present invention is in most cases in a liquid phase at room temperature, though depending on the type of compound to be mixed into the polysiloxane. So, the mixture is usable without solvents or with a small amount of a solvent. In the latter case, organic solvents which do not dissolve high molecular weight polysiloxanes may be used. On the other hand, in case that n exceeds about 10, the mixture mostly is in a solid phase, then it is desirable that the mixture be used as a solution in a solvent.

The organic solvents to be used include toluene, xylene, ethanol, n- and i-propyl alcohols, butanol, ethyl acetate, butyl acetate, Cellosolve® (UCC), Cellosolve acetate, acetone, methyl ethyl ketone, methyl isobutyl ketone, dibutyl ether, tetrahydrofuran, chlorobenzene and the like.

The mixing ratio of the polysiloxane and polyisocyanate is not necessarily limited, but it is desirable that the total equivalent of the isocyanate groups does not exceed that of the hydroxyl groups of the polysiloxane.

The ratio of the mixture of the polysiloxane compound, silane compound, alkoxide or chelate compound is not necessarily limited, but total M—O— or Si—N— equivalent (M is an element selected from the group consisting of Si, Al, Ti and Zn) does not exceed the total equivalent of the hydroxyl groups of the polysiloxane.

Also, the silane, alkoxide and chelate compounds preferably have two or more reactive sites or moieties in each compound to react with SiOH groups. The SiOH groups of the polysiloxane react with the silane compounds, alkoxides of Al, Ti or Zn, and chelate compounds, and cross-link the polysiloxane through —O—Si—O—, —O—Ti—O—, —O—Al—O— or —O—Zn—O—, respectively.

In the present invention, the term "polyisocyanate" means a compound having two or more isocyanate groups.

Examples of the compounds having two or more isocyanate groups include those compounds represented by the following formulae (IV-1) to (IV-12).

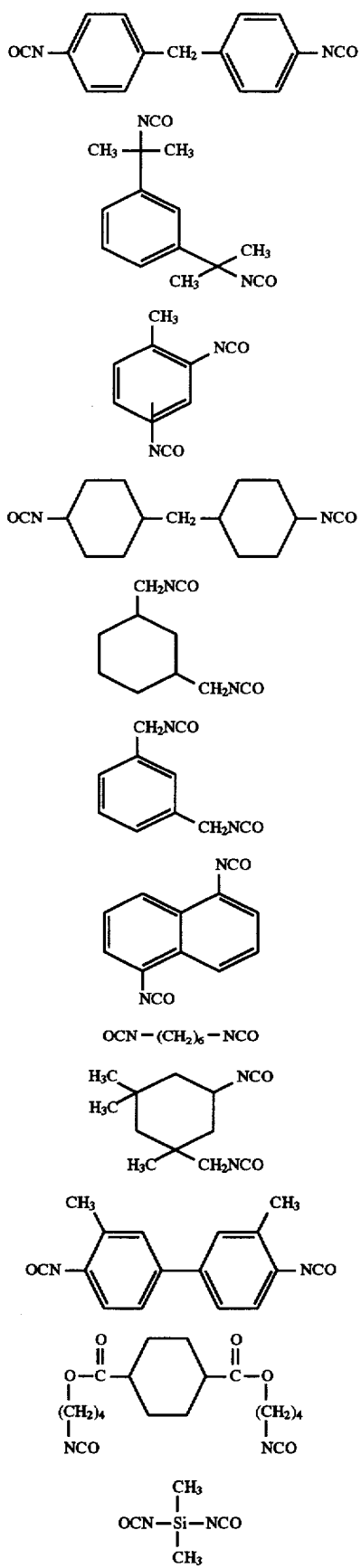

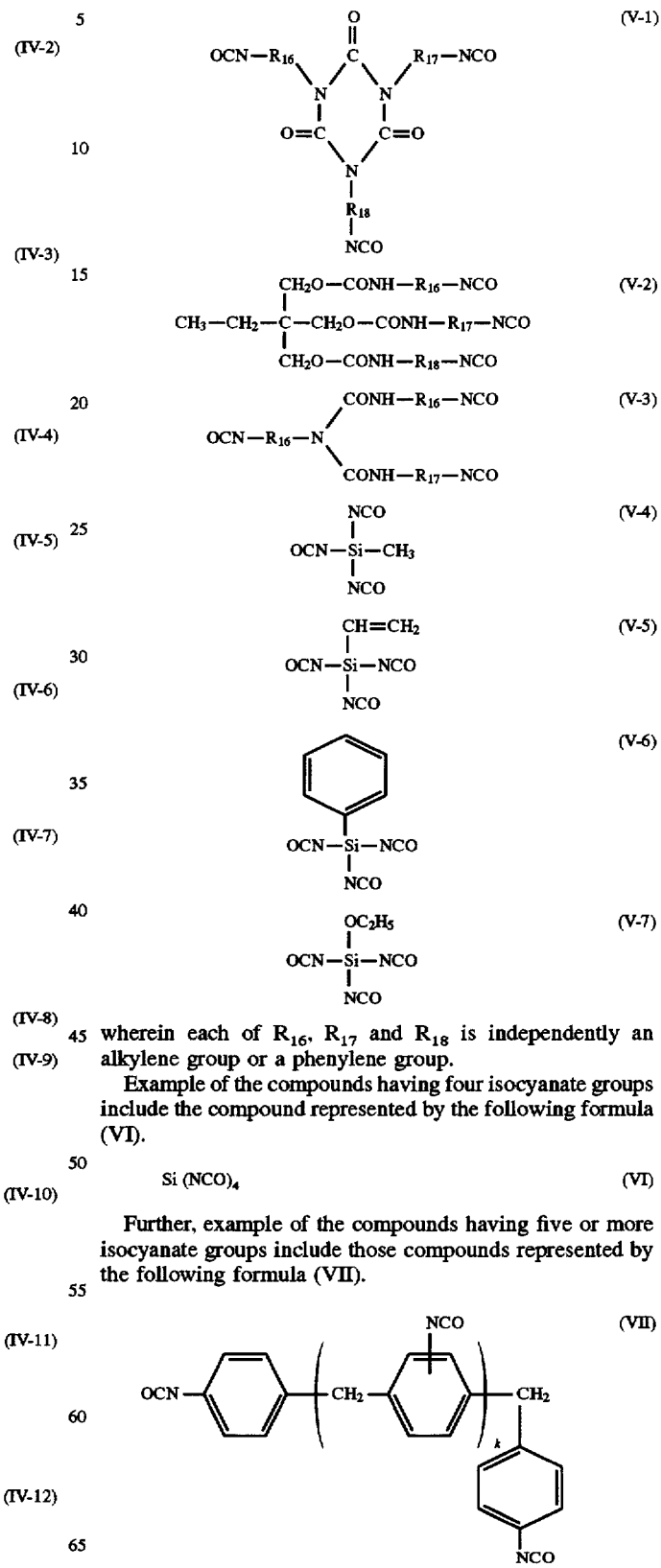

The compounds having three or more isocyanate groups are, for example, those compounds represented by the following formulae (V-1) to (V-7).

wherein each of $R_{16}$, $R_{17}$ and $R_{18}$ is independently an alkylene group or a phenylene group.

Example of the compounds having four isocyanate groups include the compound represented by the following formula (VI).

Further, example of the compounds having five or more isocyanate groups include those compounds represented by the following formula (VII).

wherein k is a positive integer.

Besides the above-mentioned polyisocyanates, the polyisocyanates of the present invention include those in which a part or all of the hydrogen atoms of the alkyl, alkylene, phenyl or phenylene group of above mentioned isocyanates are substituted with halogen or deuterium or both.

In this case, C—H vibrational absorptions in the infra-red region are reduced considerably and thus better optical transparency in the region may be obtained.

In each of the examples described previously, the polyisocyanates containing a silicon atom to which at least two of the functional groups of —N=C=O are bonded.

In the present invention, specific examples of the silane compound, alkoxide compounds and chelate compounds include the following compounds.

First, the silane compounds include, for example, acetoxysilanes such as methyltriacetoxysilane, alkoxysilanes such as methyltrimethoxysilane, phenyltriethoxysilane, tetraethoxysilane and methyltriethoxysilane; ketoximesilanes such as $CH_3Si(-ON=CX_2)_3$ ($X=CH_3$, $C_2H_5$, etc.); aminosilanes such as $CH_3Si(-NHC_4H_9)_3$; aminoxysilanes such as $CH_3Si[-ON(C_2H_5)_2]_3$; silazanes such as $CH_3Si(NR_2)_3$; and amidosilanes including $CH_3Si[N(CH_3) COCH_3]_3$.

Second, the alkoxide compounds include, for example, compounds represented by general formulae $Ti(OZ)_4$, $Zr(OZ)_4$ or $Al(OZ)_3$ where Z is an alkyl group, a cycloalkyl group or the like. Generally, there are used aliphatic alkyl groups such as methyl, ethyl, propyl and the like.

Third, the term "chelate compounds" means cyclic complex compounds which are formed by coordination of a donor, and this complex compounds have an element selected from the group consisting of Ti, Zr and Al therein. Example of the chelate compounds include di-i-propoxy bis(acetylacetone)titanate, di-n-butoxy bis(triethanolamine) titanate, Zr tetraacetylacetonate, ethyl acetoacetatoaluminum diisopropylate and aluminum tris(ethylacetoacetate).

In the present invention, the polysiloxane to be used preferably contains a hydroxyl group in its molecule. Preferably, such polysiloxane is a compound comprising at least one unit selected from the group consisting of units A, B, C and D represented by following formulae (II-1) to (II-4), respectively, and at least one unit selected from the group consisting of units E and F represented by following formulae (II-5) and (II-6), respectively:

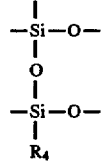

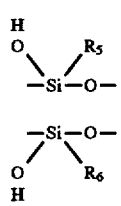

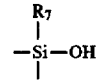

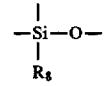

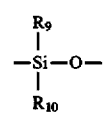

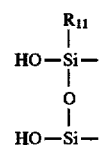

wherein each of $R_3$ to $R_{13}$ is independently an alkyl, deuterated alkyl or halogenated alkyl group, or a phenyl, deuterated phenyl or halogenated phenyl group [hereinafter, simply referred to as "polysiloxane (of compounds)(II)"]. In the present invention, when the polysiloxane has a higher hydroxyl group content, it may be mixed with a larger amount of the crosslinking agent.

The mixing ratio of the silane-containing compound (II) and the polyisocyanates should not necessarily be limited, but it is desirable that the total equivalent of isocyanate groups should not exceed the total equivalent of hydroxyl groups.

The mixing ratio of the silane-containing compound (II) and silane compound, alkoxide compound or chelate compound also should not necessarily be limited, but it is desirable that the total equivalent of M—O— or Si—N— (M is Si, Al, Ti or Zr) groups should not exceed the total equivalent of hydroxyl groups. The silane, alkoxide and chelate compounds preferably have two or more reactive sites or moieties in each compound to react with OH group of polysiloxane. Herein, as silane compounds, alkoxide compounds and chelate compounds, each aforementioned compounds may be used.

The degree of the polymerization of the silane-containing compounds (II) should not necessarily be limited. However, in case of the oligomer having a polymerization degree of more than 10, the mixture is mostly in a liquid phase at room temperature, though depending on the type of compound to be mixed. So, the mixture is usable without solvents or with a small amount of a solvent. In the latter case, there may be used organic solvents which do not dissolve high molecular weight polysiloxanes. On the other hand, in case where the polymerization degree exceeds about 10, the mixture is mostly in a solid phase. Then, it is desirable that the mixture be used as a solution in a solvent. As the solvent, each of the aforementioned solvents may be used.

Optical materials of the present invention are usually used in the form of a film or a bulk.

Therefore, it is most desirable for the mixture to be used in a state of fluid having a moderate viscosity according to the fabricating process. For this purpose, viscosity adjustment may be conducted with the above mentioned organic solvents.

The mixture is cured by heating more generally for one hour to several hours at a temperature of 50° C. to 200° C. though curing conditions depend on the type of the polyisocyanate and curing time. The mixture can be cured by keeping it at room temperature for 10 hours and more. It is advisable that the mixture be dried by heating to completely remove the solvent and unreacted isocyanate. Also, it may be dried by heating under vacuum conditions. The mixture may contain a catalyst to accelerate the crosslinking reaction. For example, curing time can be reduced by adding tin butyllaurate catalyst.

The mixture is cured in the process that the OH groups of the compound (I) or (II) react with isocyanate groups so that three-dimensional urethane bonds are formed. So, the mixture in a liquid phase can be cured through a gelation process. This cured mixture have a high solvent resistance so that it is no longer dissolved in any solvent.

As described previously, in particular cases, polyisocyanates of the present invention include the compounds that contain a silicon atom to which at least two of the functional groups —N=C=O are bonded.

A mixture including the above mentioned compounds having two or more —Si—N=C=O groups is cured by heating more generally for one hour to several hours at a temperature 50° C. to 200° C., though curing conditions depend on the type of the compound having two or more —Si—N=C=O groups and curing time. The mixture can be cured by keeping it at room temperature for 10 hours or more. It is advisable that the mixture be dried by heating to completely remove the solvent and unreacted —SiN=C=O groups. Also, it is dried by heating under vacuum condition. The mixture may contain a catalyst to accelerate the crosslinking reaction. For example, curing time can be reduced by adding a titanium octylphosphate/amine adduct catalyst.

The mixture is cured in the process where the OH groups in the compound (I) or (II) react with plural groups of —Si—N=C=O so that three-dimensional bonds are formed. Differing from the previous case using polyisocyanate, it is inferred that no urethane bond is formed in this case and —Si—O— bonds are mainly formed. So, the mixture in a liquid phase can be cured through a gelation process. This cured mixture have a high solvent resistance so that it is generally insoluble in any solvent. Further, in this case, it is expected that the product have a high thermal stability and a high optical transparency in infra-red region because of absence of N—H bonds that otherwise urethane bonds contain.

An optical material mixture containing compounds other than the aforementioned polyisocyanate can be cured by heating it generally one hour to several hours at temperature of 50° C. to 200° C., though curing conditions depend on the type of the silane compound, alkoxide compound and chelate compound and curing time. The mixture can be cured by keeping it at room temperature for several days and more. It is advisable that the mixture be dried by heating to completely remove the solvent and unreacted starting material. The optical material mixture may contain a catalyst to accelerate the crosslinking reaction. For example, curing time can be reduced by adding a tin butyllaurate catalyst. This cured mixture has a solvent resistance so that it is generally insoluble in solvents any more.

In the present invention, the polymeric optical material may also be a polysiloxane comprising a repeating unit represented by following formula (III):

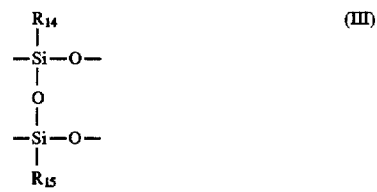

wherein each of $R_{14}$ and $R_{15}$ is independently an alkyl, deuterated alkyl or halogenated alkyl group, an alkenyl, deuterated alkenyl or halogenated alkenyl group, or a phenyl, deuterated phenyl or halogenated phenyl group; with the proviso that at least one of $R_{14}$ and $R_{15}$ is an alkyl, deuterated alkyl or halogenated alkyl group, or an alkenyl, deuterated alkenyl or halogenated alkenyl group [hereinafter, simply referred to as "polysiloxane (or compound) (III)].

In the formula (III), methyl groups, deuterated methyl groups, chloromethyl groups, vinyl groups and allyl groups are illustrated as typical examples of the alkyl, deuterated alkyl or halogenated alkyl group, or the phenyl, deuterated phenyl or halogenated phenyl group. In order to initiate the crosslinking reaction, these functional groups are heated or irradiated with light directly, heated after irradiation with light or adding free radical initiator, or initiated by irradiation with light after adding free radical initiator. However, addition of a free radical initiator is more desirable for efficient crosslinking reaction efficiently.

The optical materials of the present invention may include a solvent besides the compound (III) and a free radical initiator.

In the formula (III), the degree of polymerization n is not limited. However, the oligomer having the above-mentioned polymerization degree of n=ca. 1-10 is in most cases in a liquid phase at room temperature. So, the oligomer is usable without solvents or with a small amount of solvent. In the latter case, organic solvents which do not dissolve high molecular weight polysiloxanes may be used. On the other hand, in case that n exceeds about 10, the mixture mostly is in a solid phase. Desirably, the mixture is used as a solution in a solvent. The organic solvent to be used are, for example, toluene, xylene, ethanol, n- and i-propyl alcohol, butanol, ethyl acetate, butyl acetate, Cellosolve® (UCC), Cellosolve acetate, acetone, methyl ethyl ketone, methyl isobutyl ketone, dibutyl ether, tetrahydrofuran, chlorobenzene and the like.

The present invention relates to polymeric optical materials that contain an organic peroxide compound. As described previously, in order to initiate crosslinking reaction efficiently, it is necessary that the optical materials are heated after addition of a free radical initiator or irradiation with light after addition of a free radical initiator. The term "free radical initiator" as used herein refers to the compound which is decomposed by thermal or optical energy to generate a highly reactive free radical. More specifically, inorganic peroxides including hydrogen peroxides and organic peroxides are used. Ordinarily, it is the best way to use an organic peroxide because it is very safe to handle and stable at room temperature. The term "organic peroxide" as used herein means ketone peroxide, diacyl peroxide, hydroperoxide, dialkyl peroxide, peroxy ketal, alkyl perester, percarbonate and the like. Although the ratio of the organic peroxide is not limited, a ratio of less than 10wt % is desirable.

The polymeric optical materials of the present invention may include various functional groups such as alkyl, deuterated alkyl, halogenated alkyl, alkenyl, deuterated alkenyl and halogenated alkenyl at least one of which groups is necessarily crosslinked. The crosslinking reaction can be initiated efficiently by directly heating or irradiating with light the optical materials, or heating or irradiating with light the optical materials after adding a free radical initiator thereto. Also, the reaction may be initiated by irradiation of high energy radiation such as α-rays, β-rays, γ-rays, X rays, synchrotron radiation and the like.

Mechanism of the crosslinking reaction may be understood as follows. First, free radicals are generated in the molecular of the free radical initiator or siloxane by heating or irradiation with light. The radicals are so reactive that some of the hydrogens in the saturated hydrocarbon bond of $R_{14}$ or $R_{15}$ are extracted, and the radicals are generated within the siloxane. Then, these radicals bond to one another, thus forming bridges among the siloxane molecules to effect crosslinking.

The optical material can be cured through crosslinking reaction by heating more generally for one hour to several hours at a temperature of 50° C. to 200° C., although curing conditions depend on the presence or absence or the type of free radical initiators. The optical material can be cured by irradiating with light such as ultraviolet rays or irradiating with high energy radiation. It is advisable that the material be dried by heating to completely remove the solvent and unreacted material. This cured material has a high solvent resistance so that it is insoluble in any solvent.

The polymeric optical material of the present invention can be used for fabricating an optical waveguide having a core/clad structure, which may be that with a substrate or that in the form of fiber. In such optical waveguide, the polymeric optical material may be used as a core substance or a clad substance or both.

Figure 2:
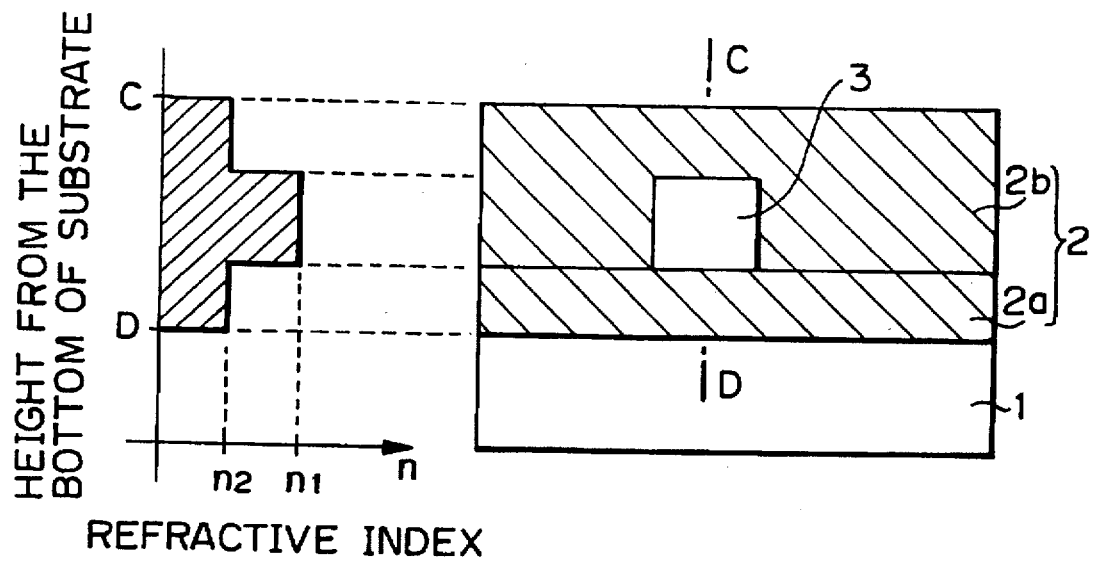
FIG. 2 is a schematic cross-sectional view showing a polymeric optical waveguide fabricated by the present invention.

A typical embodiment of the optical waveguide according to the present invention, in which the polymeric optical material is used as a cladding material, is shown in FIG. 2. In FIG. 2, an optical waveguide includes a substrate 1, a clad layer 2 provided on the substrate 1 and a core layer 3 surrounded by the clad layer 2. The clad layer is composed of a lower clad layer 2a which is overlaid onto the substrate 1 and an upper clad layer 2b which surrounds the core layer 3. The fabricating process of such optical waveguide is described hereinbelow.

First, the refractive index of the material is adjusted in accordance with the refractive index of the core material to be used and propagation mode conditions required for an optical waveguide.

Adjustment of the refractive index can be carried out in various manners. In case of using a polyisocyanate, it can be performed by specifying the type and mixing ratio of the polyisocyanate. A higher refractive index can be obtained by using an aromatic group-rich polyisocyanate compared to that which has no aromatic polyisocyanate group.

Besides the above mentioned method, adjustment of the refractive index can be carried out by specifying the type and ratio of silane compound, alkoxide compound or chelate compound. It is also carried out by adjusting the chemical composition of the polysiloxane.

Generally, a higher refractive index can be obtained by enriching the aromatic group content of polysiloxane. Also, adjustment of the refractive index can be carried out by selecting functional groups of the polysiloxane. Generally, a higher refractive index can be obtained by using an aromatic group-rich polysiloxane compared to that which has no aromatic group.

A refractive index-adjusted optical waveguide material is coated on a substrate 1 as a lower clad layer 2a by spin-coating, followed by curing by the above-mentioned method. As to the substrate, any material suitable for an optical waveguide having a core/clad structure may be used. For example, are mentioned silicon, glass and the like. Next, a core layer is coated on this lower clad layer 2a by spin-coating. The type of core material is not necessarily limited but it is desirable to use a material which has good adhesion properties to the lower clad layer of the present invention. The occurrence of intermixing can be avoided even though the core layer is coated, because the lower clad layer 2a is already cured. Then, the core layer is etched to obtain a desired shape, and finally an upper clad layer 2b is coated. As the upper clad layer 2b, it is desirable to use a material which is of a solvent-free type or which contains a solvent that dose not dissolve the core layer. For example, in case that the core layer is made of a high molecular polysilsesquioxane, alcohol- or ketone-based solvent can be used as a solvent.

A fabricating process of an optical waveguide may be the same as the above-mentioned process when the optical material of the present invention is used as a core layer. In this case, a material which is used as a clad layer 2 should have a solvent resistance similar to that of the material of the present invention.

Alternatively, a stamper process is applicable to fabrication of an optical waveguide using polymeric optical materials of the present invention. For instance, core and clad materials are provided, which have refractive indices required in accordance with the propagation mode conditions for an optical waveguide. The lower clad layer is coated on a substrate by spin-coating. The substrate to be used may be that as mentioned above. A stamper having a pattern corresponding to the shape of the core is urged to the coated substrate, with the lower clad layer being cured simultaneously. After the curing, the stamper is removed and a coating for a core layer is coated by spin-coating. Also, this layer is cured to form a ridge-shaped core. The problem of intermixing can be avoided even though the core layer is coated, because the lower clad layer is already cross-linked. Finally, an upper clad layer is coated and cured. It is most desirable to use here materials of a solvent-free type selected from among the materials of the present invention.

The optical waveguide thus fabricated is useful as various kinds of optical devices such as a directional coupler.

EXAMPLES

The present invention will be illustrated in more detail with reference to the following examples, but these examples should not be construed as limiting the scope of the invention.

Example 1

A composition was prepared which was composed of a polysiloxane material of following formula (VIII), a polyisocyanate of formula (IX) below and methyl isobutyl ketone (hereinafter, simply referred to as "MIBK") as a solvent. The weight ratio between the individual components in the composition was as follows: the polysiloxane material of the formula (VIII): the polyisocyanate of formula (IX): the solvent =1:0.9:3.8. The polysiloxane material of formula (VIII) had a weight average molecular weight (Mw) of about 2000. This composition was cured by heating at 150° C. for 1 hour, so that the composition became insoluble in any solvent. The cured product of the composition had a refractive index of 1.5319 (which was measured at a wavelength of 1.3 μm).

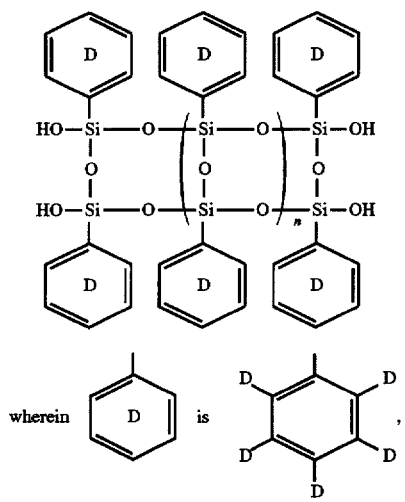
(VIII)

wherein D is [deuterated phenyl]

n is an integer and D represents a deuterium.

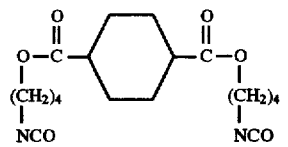
(IX)

An optical waveguide was fabricated using the cured product of the above-mentioned composition as a clad material in the following manner. First, the composition was spin-coated onto a silicon wafer to form a film. The revolution speed of the spin-coater used was regulated so that the resultant film had a thickness of about 15 μm. The film thus formed was fully cured and dried at 150° C. to thereby obtain a lower clad layer on the silicon wafer. Subsequently, a core layer was spin-coated onto the lower clad layer. The material used for the core layer was a polysiloxane containing the two units G and H represented by following formulae (X-1) and (X-2), respectively (which was composed of 8 mole % of unit G and 92 mole % of unit H) and having a refractive index of 1.5364 (which was measured at a wavelength of 1.3 μm)

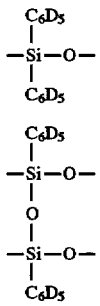
(X-1)

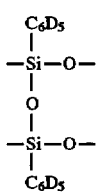
(X-2)

The spin-coating for the formation of the core layer on the lower clad layer was carried out using a 10%-polysiloxane solution in toluene, and the thickness of the resultant core layer was adjusted to 8 μm. During the spin-coating, no intermixing occurred at the interface between the core layer and the lower clad layer. The core layer thus obtained was fully dried at 200° C.

Subsequently, a linear mask pattern of 8 μm wide was formed on the core layer by photolithography. Then, the portions of the core other than that covered by the mask pattern were removed by reactive ion etching to thereby form a rectangular core ridge having a size of 8 μm wide and 8 μm high on the lower clad layer.

The material having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated. Since the material used for the core layer was also insoluble in MIBK, no intermixing was observed during the application of the upper clad layer onto the core ridge.

The propagation loss of the obtained optical waveguide was determined and found to be 0.3 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 120° C.

Example 2

A composition was prepared which was composed of a polysiloxane material basically comprising the unit of formula (XI) below (which polysiloxane material contained 50 mole % of —Si—OH structure), a polyisocyanate of formula (XII) below and a solvent (MIBK). The weight ratio between the individual components in the composition was as follows: the polysiloxane material: the polyisocyanate of formula (XII): the solvent =1:0.25:2.5. The polysiloxane material had a weight average molecular weight (Mw) of about 1000. This composition was cured by heating at 150° C. for 1 hour, so that the composition became insoluble in any solvent. The cured product of the composition had a refractive index of 1.5407 (which was measured at a wavelength of 1.3 μm).

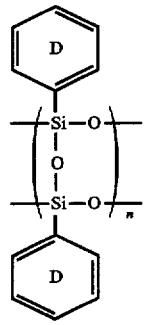
(XI)

$CH_3Si(NCO)_3$ (XII)

An optical waveguide was fabricated using the cured product of the above-mentioned composition as a clad material in the following manner. First, the composition was spin-coated onto a silicon wafer to form a film. The revolution speed of the spin-coater used was regulated so that the resultant film had a thickness of about 15 μm. The film thus formed was fully cured and dried at 150° C. to thereby obtain a lower clad layer on the silicon wafer. Subsequently, a core layer was spin-coated onto the lower clad layer. The material used for the core layer was a composition composed of the same components as the composition used for the lower clad layer, in which the weight ratio between the individual components was as follows: the polysiloxane material: the polyisocyanate of formula (XII): the solvent =1:0.15:2.3, and which had a refractive index of 1.5453 (which was measured at a wavelength of 1.3 μm). This composition was spin-coated onto the lower clad layer to form a core layer, and the thickness of the resultant core layer was adjusted to 8 μm. During the spin-coating, no intermixing occurred at the interface between the core layer and the lower clad layer. The obtained core layer was fully dried at 200° C.

Subsequently, a linear mask pattern of 8 μm wide was formed on the core layer by photolithography. Then, the portions of the core other than that covered by the mask pattern were removed by reactive ion etching to thereby form a rectangular core ridge having a size of 8 μm wide and 8 μm high on the lower clad layer.

The material having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated. During the application of the upper clad layer onto the core ridge, no intermixing was observed either.

The propagation loss of the obtained optical waveguide was determined and found to be 0.1 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 180° C.

Example 3

A composition was prepared which was composed of a polysiloxane material basically comprising the unit of formula (XIII) below (which polysiloxane material contained 50 mole % of —Si—OH structure), a polyisocyanate of formula (XIV) below and a solvent (MIBK). The weight ratio between the individual components in the composition was as follows: the polysiloxane material: the polyisocyanate of formula (XIV): the solvent =1:0.6:3.0. The polysiloxane material had a weight average molecular weight (Mw) of about 1000. This composition was cured by heating at 150° C. for 1 hour, so that the composition became insoluble in any solvent. The cured product of the composition had a refractive index of 1.5319 (which was measured at a wavelength of 1.3 μm).

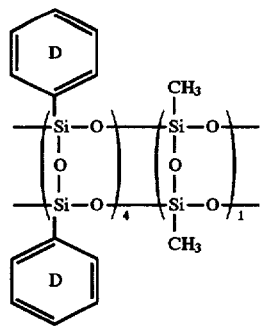

(XIII)

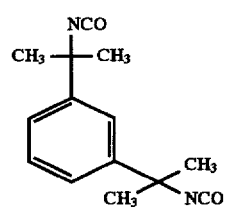

(XIV)

An optical waveguide was fabricated using the cured product of the above-mentioned composition as a clad material in the following manner. First, the composition was spin-coated onto a silicon wafer to form a film. The revolution speed of the spin-coater used was regulated so that the resultant film had a thickness of about 15 μm. The film thus formed was fully cured and dried at 150° C. to thereby obtain a lower clad layer on the silicon wafer. Subsequently, a core layer was spin-coated onto the lower clad layer. The material used for the core layer was a polysiloxane containing the two units G and H represented by following formulae (X-1) and (X-2), respectively (which was composed of 8 mole % of unit G and 92 mole % of unit H) and having a refractive index of 1.5354 (which was measured at a wavelength of 1.3 μm).

The spin-coating for the formation of the core layer on the lower clad layer was carried out using a 10%-polysiloxane solution in toluene, and the thickness of the resultant core layer was adjusted to 8 μm. During the spin-coating, no intermixing occurred at the interface between the core layer and the lower clad layer. The obtained core layer was fully dried at 200° C.

Subsequently, a linear mask pattern of 8 μm wide was formed on the core layer by photolithography. Then, the portions of the core other than that covered by the mask pattern were removed by reactive ion etching to thereby form a rectangular core ridge having a size of 8 μm wide and 8 μm high on the lower clad layer.

The material having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated. Since the material used for the core layer was also insoluble in MIBK, no intermixing was observed during the application of the upper clad layer onto the core ridge.

The propagation loss of the obtained optical waveguide was determined and found to be 0.3 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 120° C.

Example 4

Deuterated phenyltrichlorosilane (216.5 g) was dissolved in dehydrated tetrahydrofuran, and then 3 equivalents of water (54 g) was added dropwise thereto at such a dropping rate that the temperature of the resultant reaction solution never rise. After the completion of the addition of water, 3 equivalents of sodium hydrogencarbonate (252 g) was added to the reaction solution, while stirring the resulting reaction solution. After confirming the completion of generation of carbonic acid gas from the reaction solution, the stirring of the solution was further continued for additional one hour or so. Subsequently, the reaction solution was filtered and then the resultant filtrate was evaporated using a rotary evaporator, to thereby obtain a transparent viscous liquid (A). The resultant liquid (A) was determined on its molecular weight by gel permeation chromatography (GPC) and found to have a weight average molecular weight (Mw) of 2500 and a number average molecular weight (Mn) of 1600.

Composition (B) was prepared which was composed of 10 g of the above material (A), 2 g of tetraisocyanatosilane and 5 g of a solvent (MIBK). This composition was cured by heating at 150° C. for 1 hour, so that the composition became insoluble in any solvent. The cured product of the composition had a refractive index of 1.5469 (which was measured at a wavelength of 1.3 μm).

Composition (C) was prepared which was composed of 10 g of the above composition (A), 3 g of tetraisocyanatosilane and 5 g of a solvent (MIBK). This composition was cured by heating at 150° C. for 1 hour, so that the composition became insoluble to any solvent. The cured product of the composition had a refractive index of 1.5423 (which was measured at a wavelength of 1.3 μm).

An optical waveguide was fabricated with the cured products of the above-mentioned compositions (C) and (B) as a clad material and a core material, respectively, in the following manner. That is, a film of composition (C) was formed onto a silicon wafer by spin-coating. The revolution speed of the spin-coater used was regulated so that the resultant film had a thickness of about 15 μm. The film thus formed was fully cured and dried at 150° C. to thereby obtain a lower clad layer on the silicon wafer. Subsequently, composition (B) was spin-coated onto the lower clad layer as a core layer. The thickness of the resultant core layer was adjusted to 8 μm. During the spin-coating, no intermixing occurred at the interface between the core layer and the lower clad layer. The obtained core layer was fully dried at 150° C.

Subsequently, a linear mask pattern of 8 μm wide was formed on the core layer by photolithography. Then, the portions of the core other than that covered by the mask pattern were removed by reactive ion etching to thereby form a rectangular core ridge having a size of 8 μm wide and 8 μm high on the lower clad layer.

The material having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated.

The propagation loss of the obtained optical waveguide was determined and found to be 0.1 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 200° C. for at least one month.

Example 5

Composition (D) was prepared which was composed of 10 g of the above material (A), 2 g of phenyltriisocyanatosilane and 0.4 g of a titanium octylphosphate/amine adduct. This composition was a viscous liquid and was cured by heating at 150° C. for 1 hour, so that the composition became insoluble in any solvent. The cured product of the composition had a refractive index of 1.5471 (which was measured at a wavelength of 1.3 μm).

Composition (E) was prepared which was composed of 10 g of the above material (A), 2 g of phenyltriisocyanatosilane and 0.6 g of a titanium octylphosphate/amine adduct. This composition was a viscous liquid and was cured by nearing at 150° C. for 1 hour, so that the composition became insoluble in any solvent. The cured product of the composition had a refractive index of 1.5552 (which was measured at a wavelength of 1.3 μm).

An optical waveguide was fabricated with the cured products of the above-mentioned compositions (D) and (E) as a clad material and a core material, respectively, in the same manner as in Example 4. The propagation loss of the obtained optical waveguide was determined and found to be 0.1 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 150° C. for at least one month.

Example 6

Into a separable flask Equipped with a reflux condenser, were charged (deuterated phenyl)triethoxysilane (245 g), (deuterated methyl)triethoxysilane (181 g), 3 equivalents of water (108 g) and hydrochloric acid (0.1 ml). The resultant mixture was heated to 200° C. This mixture became a homogeneous solution about 10 to 20 minutes after the reflux started, The reflux with heating was further continued additional two hours. Subsequently, the mixed solution was heated to 240° C. to thereby evaporate ethanol therefrom. The amount of ethanol evaporated was about 4.8 equivalents (74 g). After cooling, the transparent viscous liquid was collected from the flask, which was named "material (F)". The resultant material (F) was subjected to the following procedure as it was. Material (F) was determined on its molecular weight by GPC and found to have a weight average molecular weight (Mw) of 1900 and a number average molecular weight (Mn) of 1300.

Composition (G) was prepared which was composed of 10 g of the above material (F) and 2 g of (deuterated methyl)-triisocyanatosilane. This composition was a viscous liquid and was cured by heating at 150° C. for 1 hour, so that the composition became insoluble in any solvent. The cured product of the composition had a refractive index of 1.4744 (which was measured at a wavelength of 1.3 μm).

Composition (H) was prepared which was composed of 10 g of the above material (F) and 3 g of (deuterated methyl)-triisocyanatosilane. This composition was a viscous liquid and was cured by heating at 150° C. for 1 hour, so that the composition became insoluble in any solvent. The cured product of the composition had a refractive index of 1.4700 (which was measured at a wavelength of 1.3 μm).

An optical waveguide was fabricated with the cured products of the above-mentioned compositions (G) and (F) as a clad material and a core material, respectively, in the same manner as in Example 4. The propagation loss of the obtained optical waveguide was determined and found to be 0.1 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 150° C. for at least one month.

Example 7

Into a separable flask equipped with a reflux condenser, were charged methyl triisocyanatosilane (178 g), 3 equivalents of water (54 g) and hydrochloric acid (0.1 ml). The resultant mixture was heated to 200° C. This mixture became a homogeneous solution about 10 to 20 minutes after the reflux started. The reflux with heating was further continued for additional two hours. Subsequently, the mixed solution was heated to 240° C. to thereby evaporate ethanol therefrom. The amount of ethanol evaporated was about 2.4 equivalents (37 g). After cooling, the transparent viscous liquid was collected from the flask, which was named "material (J)". The resultant material (J) was subjected to the following procedure as it was. Material (J) was determined on its molecular weight by GPC and found to have a weight average molecular weight (Mw) of 1900 and a number average molecular weight (Mn) of 1300.

Composition (K) was prepared which was composed of 10 g of the above material (J) and 2 g of methyl triisocyanatosilane. This composition was a viscous liquid and was cured by heating at 150° C. for 1 hour, so that the composition became insoluble in any solvent. The cured product of the composition had a refractive index of 1.4109 (which was measured at a wavelength of 1.3 μm).

Composition (M) was prepared which was composed of 10 g of the above material (J) and 3 g of methyl triisocyanatosilane. This composition was a viscous liquid and was cured by heating at 150° C. for 1 hour, so that the composition became insoluble in any solvent. The cured product of the composition had a refractive index of 1.4067 (which was measured at a wavelength of 1.3 μm).

Subsequently, the obtained composition (M) was spin-coated onto an Si substrate. Onto the resultant was urged a stamper having a convex shape corresponding to the intended (predetermined) shape of the core. The resultant with the stamper was heated at 150° C. for curing the coated layer. After the curing, the stamper was taken off from the resultant, to thereby form a depression of 8 μm depth and 8 μm width on the surface of the layer. Thus, a lower clad layer was formed. Onto the obtained lower clad layer, composition (K) was spin-coated. The time for spin-coating and the revolution speed of the spin-coater used were regulated so that a film having a thickness of 0.5 μm or less was formed on the lower clad layer and the composition (K) was charged into the depression of the lower clad layer. The resultant was cured by heating at 150° C. to thereby form a ridge-type core. Finally, an upper clad was applied onto the ridge-type core and then cured. Thus, an optical waveguide having a core-clad structure was fabricated.

The propagation loss of the obtained optical waveguide was determined and found to be 0.3 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 200° C. for at least one month.

Example 8

Into a separable flask equipped with a reflux condenser, were charged (deuterated methyl)triethoxysilane (181 g), 3 equivalents of water (54 g) and hydrochloric acid (0.1 ml). The resultant mixture was heated to 200° C. This mixture became a homogeneous solution about 10 to 20 minutes after the reflux started. The reflux with heating was further continued for additional 2 hours. Subsequently, the mixed solution was heated to 240° C. to thereby evaporate ethanol therefrom. The amount of ethanol evaporated was about 2.4 equivalents (37 g). After cooling, the transparent viscous liquid was collected from the flask, which was named "material (N)". The resultant material (N) was subjected to the following procedure as it was. Material (F) was determined on its molecular weight by GPC and found to have a weight average molecular weight (Mw) of 1900 and a number average molecular weight (Mn) of 1300.

Composition (P) was prepared which was composed of 10 g of the above material (N) and 2 g of (deuterated methyl) triisocyanatosilane. This composition was a viscous liquid and cured by heating at 150° C. for 1 hour, so that the composition became insoluble in any solvent. The cured product of the composition had a refractive index of 1.4109 (which was measured at a wavelength of 1.3 μm).

Composition (Q) was prepared which was composed of 10 g of the above material (N) and 3 g of (deuterated methyl) triisocyanatosilane. This composition was a viscous liquid and cured by heating at 150° C. for 1 hour, so that the composition became insoluble in any solvent. The cured product of the composition had a refractive index of 1.4067 (which was measured at a wavelength of 1.3 μm).

An optical waveguide was fabricated with the cured products of the above-mentioned compositions (G) and (F) as a clad material and a core material, respectively, in the same manner as in Example 7.

The propagation loss of the obtained optical waveguide was determined and found to be 0.1 dB/cm or lower at both wavelengths of 1.3 μm and 1.5 μm. It was also found that the optical waveguide effectively worked as a single-mode optical waveguide at these wavelengths. The optical waveguide showed no increase in loss even after it was kept at 200° C. for at least one month.

Example 9

Deuterated phenyltrichlorosilane (216.5 g) was dissolved in dehydrated tetrahydrofuran, and then 3 equivalents of water (54 g) was added dropwise thereto at such a dropping rate that the temperature of the resultant reaction solution never rise. After the completion of the addition of water, 3 equivalents of sodium hydrogencarbonate (252 g) was added to the reaction solution, while stirring the resulting reaction solution. After confirming the completion of generation of carbonic acid gas from the reaction solution, the stirring of the solution was further continued for additional one hour or so. Subsequently, the reaction solution was filtered and then the resultant filtrate was evaporated using a rotary evaporator, to thereby obtain a transparent viscous liquid (1). The resultant liquid (1) was determined on its molecular weight by gel permeation chromatography (GPC) and found to have a weight average molecular weight (Mw) of 2500 and a number average molecular weight (Mn) of 1600.

Composition (2) was prepared which was composed of 10 g of the above material (1), 2 g of tetraethoxysilane, 10 mg of dibutyltin dilaurate, and 5 g of a solvent (MIBK). This composition was cured by heating at 150° C. for 1 hour, so that the composition became insoluble in any solvent. The cured product of the composition had a refractive index of 1.5407 (which was measured at a wavelength of 1.3 μm).

Composition (3) was prepared which was composed of 10 g of the above composition (1), 2 g of tetraethoxysilane, 10 mg of dibutyltin dilaurate, and 5 g of a solvent (MIBK). This composition was cured by heating at 150° C. for 1 hour, so that the composition became insoluble to any solvent. The cured product of the composition had a refractive index of 1.5361 (which was measured at a wavelength of 1.3 μm).

An optical waveguide was fabricated with the cured products of the above-mentioned compositions (2) and (3) as a clad material and a core material, respectively, in the following manner. That is, a film of composition (3) was formed onto a silicon wafer by spin-coating. The revolution speed of the spin-coater used was regulated so that the resultant film had a thickness of about 15 μm. The film thus formed was fully cured and dried at 150° C. to thereby obtain a lower clad layer on the silicon wafer. Subsequently, composition (2) was spin-coated onto the lower clad layer as a core layer. The thickness of the resultant core layer was adjusted to 8 μm. During the spin-coating, no intermixing occurred at the interface between the core layer and the lower clad layer. The obtained core layer was fully dried at 150° C.

Subsequently, a linear mask pattern of 8 μm wide was formed on the core layer by photolithography and ion milling. Then, the portions of the core other than that covered by the mask pattern were removed by reactive ion etching to thereby form a rectangular core ridge having a size of 8 μm wide and 8 μm high on the lower clad layer.

The material having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated.

The propagation loss of the obtained optical waveguide was determined and found to be 0.3 dB/cm or lower at both wavelengths of 1.3 μm and 1.55 μm. It was also found that the optical waveguide effectively worked as a single mode optical waveguide at these wavelengths. The optical waveguide showed no increase in loss even after it was kept at 150° C. for at least one month.

Example 10

In a dry box was prepared a mixture which was composed of 10 g of material (1) and 2 g of aluminum sec-butylate. This composition was a viscous liquid and was cured by heating at 150° C. for 1 hour, so that the composition became insoluble in any solvent. The cured product of the composition had a refractive index of 1.5456 (which was measured at a wavelength of 1.3 μm).

Composition (5) was prepared which was composed of 10 g of the above material (1) and 3 g of aluminum sec-butylate. This composition was a viscous liquid and was cured by heating at 150° C. for 1 hour, so that the composition became insoluble in any solvent. The cured product of the composition had a refractive index of 1.5502 (which was measured at a wavelength of 1.3 μm).

Subsequently, the obtained composition (4) was spin-coated onto an Si substrate. Onto the resultant was urged a stamper having a convex shape corresponding to the intended shape of the core. The resultant with the stamper was heated to 150° C. for curing the coated layer. After the curing, the stamper was taken off from the resultant, to thereby form a depression of 8 μm depth and 8 μm width on the surface of the layer. Thus, a lower clad was formed. Onto the obtained lower clad layer, composition (5) was spin-coated. The time for spin-coating and the revolution speed of the spin-coater used were regulated so that a film having a thickness of 0.5 μm or less was formed on the lower clad layer and the composition (5) was charged into the depression of the lower clad layer. The resultant was cured by heating at 150° C. to thereby form a ridge-type core. Finally, an upper clad was applied onto the ridge-type core and then cured. Thus, an optical waveguide having a core-clad structure was fabricated.

The propagation loss of the obtained optical waveguide was determined and found to be 0.3 dB/cm or lower at both wavelengths of 1.3 μm and 1.55 μm. It was also found that the optical waveguide effectively worked as a single-mode optical waveguide at these wavelengths. The optical waveguide showed no increase in loss even after it was kept at 150° C. for at least one month.

Example 11

Into a separable flask equipped with a reflux condenser, were charged (deuterated phenyl)triethoxysilane (245 g), 3 equivalents of water (54 g) and hydrochloric acid (0.1 ml). The resultant mixture was heated to 200° C. This mixture became a homogeneous solution about 10 to 20 minutes after the reflux started. The reflux with heating was further continued for additional 2 hours. Subsequently, the mixed solution was heated to 240° C. to thereby evaporate ethanol therefrom. The amount of ethanol evaporated was about 2.4 equivalents (37 g). After cooling, the transparent viscous liquid was collected from the flask, which was named "material (6)". The resultant material (6) was subjected to the following procedure as it was. Material (6) was determined on its molecular weight by GPC and found to have a weight average molecular weight (Mw) of 1900 and a number average molecular weight (Mn) of 1300.

Composition (7) was prepared which was composed of 10 g of the above material (6) and 2 g of di-i-propoxy-bis (acetylacetone)-titanate. This composition was a viscous liquid and was cured by heating at 150° C. for 1 hour, so that the composition became insoluble in any solvent. The cured product of the composition had a refractive index of 1.5450 (which was measured at a wavelength of 1.3 μm).

Composition (8) was prepared which was composed of 10 g of the above material (6) and 3 g of di-i-propoxy-bis (acetylacetone)-titanate. This composition was a viscous liquid and was cured by heating at 150° C. for 1 hour, so that the composition became insoluble in any solvent. The cured product of the composition had a refractive index of 1.5496 (which was measured at a wavelength of 1.3 μm).

An optical waveguide was fabricated with the cured products of the above-mentioned compositions (7) and (8) as a clad material and a core material, respectively, in the same manner as in Example 1. The propagation loss of the obtained optical waveguide was determined and found to be 0.3 dB/cm or lower at both wavelengths of 1.3 μm and 1.5 μm. It was also found that the optical waveguide effectively worked as a single-mode optical waveguide at these wavelengths. The optical waveguide showed no increase in loss even after it was kept at 150° C. for at least one month.

Example 12

Deuterated phenyltrichlorosilane (216.5 g) and methyltrichlorosilane (15 g) were dissolved in dehydrated tetrahydrofuran, and then 3 equivalents of water (59.4 g) was added dropwise thereto at such a dropping rate that the temperature of the resultant reaction solution never rise. After the completion of the addition of water, 3 equivalents of sodium hydrogencarbonate (278 g) was added to the reaction solution, while stirring the resulting reaction solution. After confirming the complete generation of carbonic acid gas from the reaction solution, the stirring of the solution was further continued for additional one hour or so. Subsequently, the reaction solution was filtered and then the resultant filtrate was evaporated using a rotary evaporator for removing tetrahydrofuran therefrom, to thereby obtain a colorless transparent viscous liquid (9). The resultant liquid (9) was determined on its molecular weight by GPC and found to have a weight average molecular weight (Mw) of 2500 and a number average molecular weight (Mn) of 1600.

Composition (10) was prepared which was composed of 10 g of the above material (9), 2 g of tetraethoxyzirconium and 2 g of a solvent (MIBK). This composition was cured by heating at 150° C. for 1 hour, so that the composition became insoluble in any solvent. The cured product of the composition had a refractive index of 1.5318 (which was measured at a wavelength of 1.3 μm).

An optical waveguide was fabricated with the cured products of composition (10) as a clad material in the following manner. First, a film of composition (10) was formed onto a silicon wafer by spin-coating. The revolution speed of the spin-coater used was regulated so that the resultant film had a thickness of about 15 µm. The film thus formed was fully cured and dried at 150° C. to thereby obtain a lower clad layer on the silicon wafer. Subsequently, a core layer was applied onto the resultant lower clad layer. The material used for the core layer material was a polysiloxane containing the two units G and H represented by the formulae (X-1) and (X-2), respectively, shown in Example 1 (which polysiloxane was composed of 8 mole % of unit G and 92 mole % of unit H) and having a refractive index of 1.5364 (which was measured at a wavelength of 1.3 µm).

The spin-coating for the formation of the core layer on the lower clad layer was carried out using a 10%-polysiloxane solution in anisole, and the thickness of the resultant core layer was adjusted to 8 µm. During the spin-coating, no intermixing occurred at the interface between the core layer and the lower clad layer. The obtained core layer was fully dried at 200° C.

Subsequently, a linear mask pattern of 8 µm wide was formed on the core layer by photolithography and ion milling. Then, the portions of the core other than that covered by the mask pattern were removed by reactive ion etching to thereby form a rectangular core ridge having a size of 8 µm wide and 8 µm high on the lower clad layer.

Composition (10), which had the same composition as that of the lower clad layer material, was applied onto the resultant core ridge, and then cured and dried in the same manner as mentioned above, to thereby form an upper clad layer on the core ridge. Thus, an optical waveguide having a core/clad structure was fabricated. Since the material used for the core layer was also insoluble in MIBK, no intermixing was observed during the application of the upper clad layer onto the core ridge.

The propagation loss of the obtained optical waveguide was determined and found to be 0.3 dB/cm or lower at both wavelengths of 1.3 µm and 1.55 µm. It was also found that the optical waveguide effectively worked as a single-mode optical waveguide at these wavelengths. The optical waveguide showed no increase in loss even after it was kept at 150° C.

Example 13

(Deuterated phenyl)trichlorosilane (216.5 g) and methyltrichlorosilane (149.5 g) were dissolved in dehydrated tetrahydrofuran, and then 3 equivalents of water (108 g) was added dropwise thereto at such a dropping rate that the temperature of the resultant reaction solution never rises. After the completion of the addition of water, 3 equivalents of sodium hydrogencarbonate (504 g) was added to the reaction solution, while stirring the resulting reaction solution. After confirming the completion of generation of carbonic acid gas from the reaction solution, the stirring of the solution was further continued for additional one hour or so. Subsequently, the reaction mixture was filtered and then the resultant filtrate was evaporated using a rotary evaporator for removing tetrahydrofuran therefrom, to thereby obtain a colorless transparent viscous liquid (11). The obtained liquid (11) was determined on its molecular weight by GPC and found to have a weight average molecular weight (Mw) of 2500 and a number average molecular weight (Mn) of 1600.

Subsequently, (deuterated phenyl)trichlorosilane (216.5 g) and methyltrichlorosilane (209.3 g) were dissolved in dehydrated tetrahydrofuran, and then 3 equivalents of water (129.6 g) was added dropwise thereto at such a dropping rate that the temperature of the resultant reaction solution never rises. After the completion of the addition of water, 3 equivalents of sodium hydrogencarbonate (605 g) was added to the reaction solution, while stirring the resulting reaction mixture. After confirming the completion of generation of carbonic acid gas from the reaction mixture, the stirring of the solution was further continued for additional one hour or so. Subsequently, the reaction mixture was filtered and then the resultant filtrate was evaporated using a rotary evaporator for removing tetrahydrofuran therefrom, to thereby obtain a colorless transparent viscous liquid (12). The obtained liquid (12) was determined on its molecular weight by GPC and found to have a weight average molecular weight (Mw) of 2600 and a number average molecular weight (Mn) of 1800.

Composition (13) was prepared which was composed of 10 g of the above material (12), 0.2 g of t-butyl peroxyacetate and 2 g of a solvent (MIBK). This composition was cured by heating at 150° C. for 1 hour, so that the composition became insoluble in any solvent. The cured product of the composition had a refractive index of 1.4708 (which was measured at a wavelength of 1.3 µm).

Composition (14) was prepared which was composed of 10 g of the above material (12), 0.2 g of t-butyl peroxyacetate and 2 g of a solvent (MIBK). This composition was cured by heating at 150° C. for 1 hour, so that the composition became insoluble in any solvent. The cured product of the composition had a refractive index of 1.4664 (which was measured at a wavelength of 1.3 µm).

An optical waveguide was fabricated with the cured products of compositions (13) and (14) as a core material and a clad material, respectively, in the following manner. First, a film of composition (14) was formed onto a silicon wafer by spin-coating. The revolution speed of the spin-coater used was regulated so that the resultant film had a thickness of about 15 µm. The film thus formed was fully cured and dried at 150° C. to thereby obtain a lower clad layer on the silicon wafer. Subsequently, composition (13) was applied onto the resultant lower clad layer as a core layer, and the thickness of the resultant core layer was adjusted to 8 µm. During the spin-coating, no intermixing occurred at the interface between the core layer and the lower clad layer. The obtained core layer was fully dried at 150° C.

Subsequently, a linear, metallic mask pattern of 8 µm wide was formed on the core layer by photolithography and ion milling. Then, the portions of the core other than that covered by the mask pattern were removed by reactive ion etching to thereby form a rectangular core ridge having a size of 8 µm wide and 8 µm high on the lower clad layer.

The composition having the same composition as that of the lower clad layer material was applied onto the resultant core ridge, and then cured and dried in the same manner as mentioned above, to thereby form an upper clad layer on the core ridge. Thus, an optical waveguide having a core/clad structure was fabricated.

The propagation loss of the obtained optical waveguide was determined and found to be 0.3 dB/cm or lower at both wavelengths of 1.3 µm and 1.55 µm. It was also found that the optical waveguide effectively worked as a single-mode optical waveguide at these wavelengths. The optical waveguide showed no increase in loss even after it was kept at 150° C. for at least one month.

Example 14

Deuterated phenyltrichlorosilane (216.5 g) and methyltrichlorosilane (15 g) were dissolved in dehydrated tetrahydrofuran, and then 3 equivalents of water (59.4 g) was added dropwise thereto at such a dropping rate that the temperature of the resultant reaction solution never rises. After the completion of the addition of water, 3 equivalents of sodium hydrogencarbonate (278 g) was added to the reaction solution, while stirring the resulting reaction solution. After confirming the completion of generation of carbonic acid gas from the reaction solution, the stirring of the solution was further continued for additional one hour or so. Subsequently, the reaction solution was filtered and then the resultant filtrate was evaporated using a rotary evaporator for removing tetrahydrofuran therefrom, to thereby obtain a colorless, transparent viscous liquid (15). The obtained liquid (15) was determined on its molecular weight by GPC and found to have a weight average molecular weight (Mw) of 2500 and a number average molecular weight (Mn) of 1600.

Composition (16) was prepared which was composed of 10 g of the above material (15), 0.2 g of t-butyl peroxyacetate and 2 g of a solvent (MIBK). This composition was cured by heating at 150° C. for 1 hour, so that the composition became insoluble in any solvent. The cured product of the composition had a refractive index of 1.5318 (which was measured at a wavelength of 1.3 µm).

An optical wave guide was fabricated with the cured products of composition (16) as a clad material in the following manner. First, a film of composition (16) was formed onto a silicon wafer by spin-coating. The revolution speed of the spin-coater used was regulated so that the resultant film had a thickness of about 15 µm. The film thus formed was fully cured and dried at 150° C. to thereby obtain a lower clad layer on the silicon wafer. Subsequently, a core layer was applied onto the resultant lower clad layer. The material used for the core layer material was a polysiloxane containing the two units of G and H represented by the formulae (X-1) and (X-2), respectively, shown in Example 1 (which polysiloxane was composed of 8 mole % of unit G and 92 mole % of unit H) and having a refractive index of 1.5364 (which was measured at a wavelength of 1.3 µm).

The spin-coating for the formation of the core layer on the lower clad layer was carried out using a 10%-polysiloxane solution in anisole, and the thickness of the resultant core layer was adjusted to 8 µm. During the spin-coating, no intermixing occurred at the interface between the core layer and the lower clad layer. The obtained core layer was fully dried at 200° C.

Subsequently, a linear, metallic mask pattern of 8 µm wide was formed on the core layer by photolithography and ion milling. Then, the portions of the core other than that covered by the mask pattern were removed by reactive ion etching to thereby form a rectangular core ridge having a size of 8 µm wide and 8 µm high on the lower clad layer.

Composition (16), which had the same composition as that of the lower clad layer material, was applied onto the resultant core ridge, and then cured and dried in the same manner as mentioned above, to thereby form an upper clad layer on the core ridge. Thus, an optical waveguide having a core/clad structure was fabricated. Since the material used for the core layer was also insoluble in MIBK, no intermixing was observed during the application of the upper clad layer onto the core ridge.

The propagation loss of the obtained optical waveguide was determined and found to be 0.3 dB/cm or lower at both wavelengths of 1.3 µm and 1.55 µm. It was also found that the optical waveguide effectively worked as a single-mode optical waveguide at these wavelengths. The optical waveguide showed no increase in loss even after it was kept at 150° C.

Example 15

Into a separable flask equipped with a reflux condenser, were charged (deuterated methyl)triethoxysilane (181 g), (deuterated phenyl)triethoxysilane, 3 equivalents of water (108 g) and hydrochloric acid (0.1 ml). The resultant mixture was heated to 200° C. This mixture became a homogeneous solution about 10 to 20 minutes after the reflux started. The reflux with heating was further continued for additional 2 hours. Subsequently, the mixed solution was heated to 240° C. to thereby evaporate ethanol therefrom. The amount of ethanol evaporated was about 2.4 equivalents (221 g). After cooling, the transparent viscous liquid was named "material (17)". The resultant material (17) was subjected to the following procedure as it was. Material (17) was determined on its molecular weight by GPC and found to have a weight average molecular weight (Mw) of 1900 and a number average molecular weight (Mn) of 1300.

Composition (18) was prepared which was composed of 10 g of the above material (17) and 0.2 g of t-butyl peroxyacetate. This composition was a viscous liquid and was cured by heating at 150° C. for 1 hour, so that the composition became insoluble in any solvent. The cured product of the composition had a refractive index of 1.4708 (which was measured at a wavelength of 1.3 µm).

Subsequently, into a separable flask equipped with a reflux condenser, were Charged (deuterated phenyl) triethoxysilane (245 g), (deuterated methyl)triethoxysilane (253.4 g), 3 equivalents of water (129.6 g) and hydrochloric acid (0.1 ml). The resultant mixture was heated to 200° C. This mixture became a homogeneous solution about 10 to 20 minutes after the reflux started. The reflux with heating was further continued for additional 2 hours. Subsequently, the mixed solution was heated to 240° C. to thereby evaporate ethanol therefrom. The amount of ethanol evaporated was about 2.4 equivalents (265 g). After cooling, the transparent viscous liquid was named. "material (19)". The resultant material (19) was subjected to the following procedure as it was. Material (17) was determined on its molecular weight by GPC and found to have a weight average molecular weight (Mw) or 1900 and a number average molecular weight (Mn) of 1300.

Composition (20) was prepared which was composed of 10 g of the above material (19) and 0.2 g of t-butyl peroxyacetate. This composition was a viscous liquid and was cured by heating at 150° C. for 1 hour, so that the composition became insoluble in any solvent. The cured product of the composition had a refractive index of 1.4664 (which was measured at a wavelength of 1.3 µm).

Subsequently, the obtained composition (20) was spin-coated onto an Si substrate. Onto the resultant was urged a stamper having a convex shape corresponding to the intended shape of the core. The resultant with the stamper was heated at 150° C. to be cured. After curing, the stamper was taken off from the resultant, to thereby form a depression of 8 µm depth and 8 µm width on the surface of the layer. The resultant was used as a lower clad. Onto the obtained lower clad layer, composition (18) was spin-coated. The time for spin-coating and the revolution speed of the spin-coater used were regulated so that a film having a thickness of 0.5 µm or less was formed on the lower clad layer and the composition (18) was charged into the depression of the lower clad layer. The resultant was cured by heating at 150° C. to thereby form a ridge-type core. Finally, an upper clad was applied onto the ridge-type core and then cured. Thus, an optical waveguide having a core-clad structure was fabricated.

The propagation loss of the obtained optical waveguide was determined and found to be 0.3 dB/cm or lower at both wavelengths of 1.3 µm and 1.55 µm. It was also found that the optical waveguide effectively worked as a single-mode optical waveguide at these wavelengths. The optical waveguide showed no increase in loss even after it was kept at 150° C. for at least one month.

Example 16

Deuterated phenyltrichlorosilane (216.5 g) and vinyltrichlorosilane (161.5 g) were dissolved in dehydrated tetrahydrofuran, and then 3 equivalents of water (108 g) was added dropwise thereto at such a dropping rate that the temperature of the resultant reaction solution never rises. After the completion of the addition of water, 3 equivalents of sodium hydrogencarbonate (504 g) was added to the reaction solution, while stirring the resulting reaction solution. After confirming the completion of generation of carbonic acid gas from the reaction solution, the stirring of the solution was further continued for additional one hour or so. Subsequently, the reaction solution was filtered and then the resultant filtrate was evaporated using a rotary evaporator for removing tetrahydrofuran therefrom, to thereby obtain a colorless, transparent viscous liquid (21). The obtained liquid (21) was determined on its molecular weight by GPC and found to have a weight average molecular weight (Mw) of 2500 and a number average molecular weight (Mn) of 1600.

Subsequently, (deuterated phenyl)trichlorosilane (216.5 g) and vinyltrichlorosilane (226 g) were dissolved in dehydrated tetrahydrofuran, and then 3 equivalents of water (130 g) was added dropwise thereto at such a dropping rate that the temperature of the resultant reaction solution never rises. After the completion of the addition of water, 3 equivalents of sodium hydrogencarbonate (605 g) was added to the reacts on solution, while stirring the resulting reaction solution. After confirming the completion of generation of carbonic acid gas from the reaction solution, the stirring of the solution was further continued for additional one hour or so. Subsequently, the reaction solution was filtered and then the resultant filtrate was evaporated using a rotary evaporator for removing tetrahydrofuran therefrom, to thereby obtain a colorless, transparent viscous liquid (22). The obtained liquid (22) was determined on its molecular weight by GPC and found to have a weight average molecular weight (Mw) of 2600 and a number average molecular weight (Mn) of 1800.

Composition (23) was prepared which was composed of 10 g of the above material (21), 0.2 g of t-butyl peroxyacetate and 2 g of a solvent (MIBK). This composition was cured by heating at 150° C. for 1 hour, so that the composition became insoluble in any solvent. The cured product of the composition had a refractive index of 1.4687 (which was measured at a wavelength of 1.3 µm).

Composition (24) was prepared which was composed of 10 g of the above material (22), 0.2 g of t-butyl peroxyacetate and 2 g of a solvent (MIBK). This composition was cured by heating at 150° C. for 1 hour, so that the composition became insoluble in any solvent. The cured product of the composition had a refractive index of 1.4643 (which was measured at a wavelength of 1.3 µm).

An optical waveguide was fabricated with the cured products of compositions (23) and (24) as a core material and a clad material, respectively, in the following manner. First, a film of composition (24) was formed onto a silicon wafer by spin-coating. The revolution speed of the spin-coater used was regulated so that the resultant film had a thickness of about 15 µm. The film thus formed was fully cured and dried at 150° C. to thereby obtain a lower clad layer on the silicon wafer. Subsequently, composition (23) was applied onto the resultant lower clad layer as a core layer. The thickness of the resultant core layer was adjusted to 8 µm. During the spin-coating, no intermixing occurred at the interface between the core layer and the lower clad layer. The obtained core layer was fully dried at 150° C.

Subsequently, a linear, metallic mask pattern of 8 µm wide was formed on the core layer by photolithography and ion milling. Then, the portions of the core other than that covered by the mask pattern were removed by reactive ion etching to thereby form a rectangular core ridge having a size of 8 µm wide and 8 µm high on the lower clad layer.

The composition which was the same as the lower clad material was applied onto the resultant core ridge, and then cured and dried in the same manner as mentioned above, to thereby form an upper clad layer on the core ridge. Thus, an optical waveguide having a core/clad structure was fabricated.

The propagation loss of the obtained optical waveguide was determined and found to be 0.3 dB/cm or lower at both wavelengths of 1.3 µm and 1.55 µm. It was also found that the optical waveguide effectively worked as a single-mode optical waveguide at these wavelengths. The optical waveguide showed no increase in loss even after it was kept at 150° C. for at least one month.

Example 17

The optical waveguides fabricated in Examples 1 to 16 were respectively determined on their propagation losses at shorter wavelengths (0.65, 0.85 and 1.02 µm). The results are shown in Table 1, which showed low propagation losses, as low as 0.3 dB/cm or less. As a result, it was concluded that the optical waveguides of the present invention can be used in a wide range of wavelength regions, as well as at 1.3 and 1.55 µm.

TABLE 1

| | Loss (dB/cm) | | |
|---|---|---|---|
| Ex. No. | 0.65 µm | 0.85 µm | 1.02 µm |
| 1 | 0.2 | 0.08 | 0.08 |
| 2 | 0.3 | 0.1 | 0.1 |
| 3 | 0.3 | 0.1 | 0.1 |
| 4 | 0.3 | 0.1 | 0.1 |
| 5 | 0.3 | 0.1 | 0.1 |
| 6 | 0.2 | 0.09 | 0.09 |
| 7 | 0.3 | 0.1 | 0.1 |
| 8 | 0.3 | 0.1 | 0.1 |
| 9 | 0.3 | 0.1 | 0.1 |
| 10 | 0.3 | 0.2 | 0.2 |
| 11 | 0.3 | 0.1 | 0.1 |
| 12 | 0.3 | 0.1 | 0.1 |
| 13 | 0.3 | 0.1 | 0.1 |
| 14 | 0.3 | 0.2 | 0.2 |
| 15 | 0.3 | 0.1 | 0.1 |
| 16 | 0.3 | 0.1 | 0.1 |

Example 18

Figure 3:
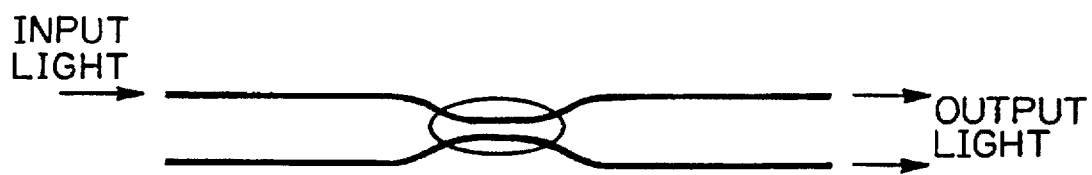
FIG. 3 is a conceptual view showing a directional coupler fabricated by the present invention.
Figure 4:
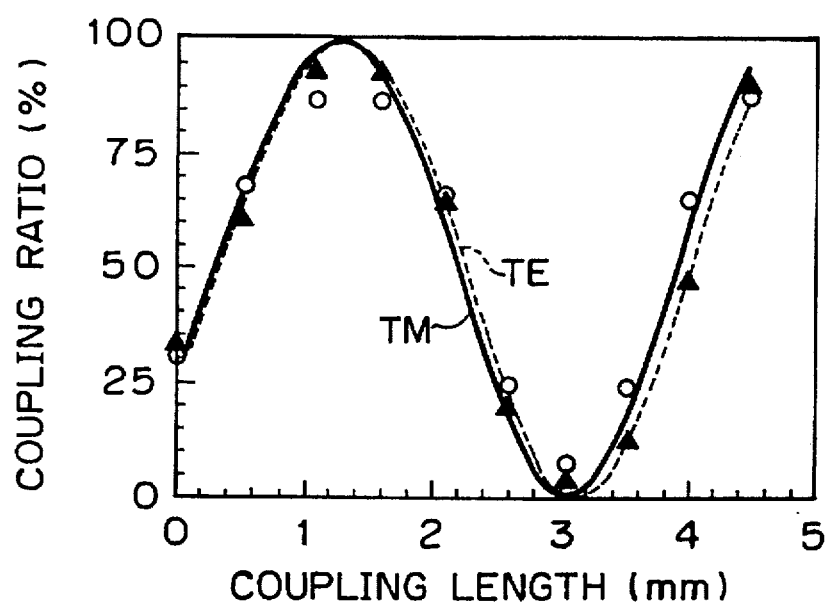
FIG. 4 is a characteristic graph illustrating the coupling characteristics at a wavelength of 1.3 μm of the directional coupler shown in FIG. 3.

A directional coupler, which is a basic optical element having a structure as shown in FIG. 3, was fabricated employing the same materials and the same procedure as in Example 1. The obtained directional coupler showed the coupling characteristic shown in FIG. 4 for light having a wavelength of 1.3 µm. As a result, it was found that the obtained directional coupler was practically usable. This result means that the optical waveguide according to the present invention has a refractive index distribution adhered to the designed values and suggests that the technique of the present invention can depress the occurrence of intermixing at the interface between the clad layer and the core layer.

The present invention has been described in detail with respect to various embodiments, and it will now be apparent from the foregoing to those skilled in the art that changes and modification may be made without departing from the invention in its broader aspects, and it is the intention, therefore, in the appended claims to cover all such changes and modifications as fill within the true spirit of the invention.

What is claimed is:

1. A polymeric optical mixture, comprising:

a polysiloxane comprising a repeat unit represented by formula (I):

$$\begin{array}{c} R_1 \\ | \\ -Si-O- \\ | \\ O \\ | \\ -Si-O-, \\ | \\ R_2 \end{array} \quad (I)$$

wherein each of $R_1$ and $R_2$ is independently (a) an alkyl, deuterated alkyl or halogenated alkyl group, or (b) a phenyl, deuterated phenyl or halogenated phenyl group; and a cross-linking agent which is capable of cross-linking said polysiloxane, and which is selected from the group consisting of (a) a polyisocyanate selected from the group consisting of compounds of formulae which follow:

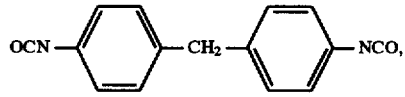

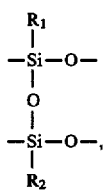

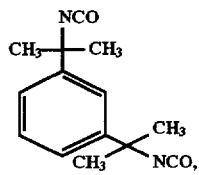

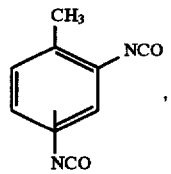

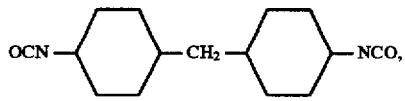

-continued

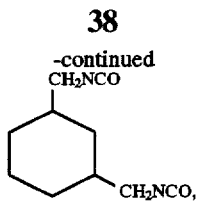

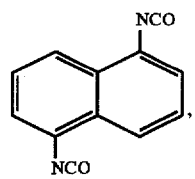

$OCN-(CH_2)_6-NCO,$

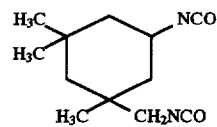

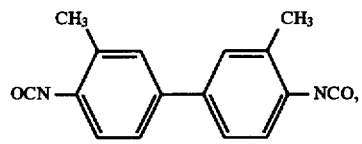

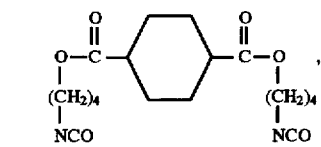

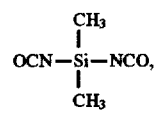

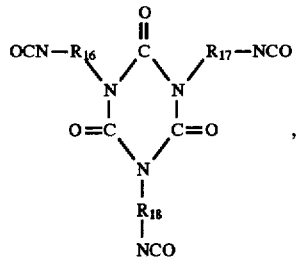

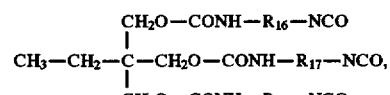

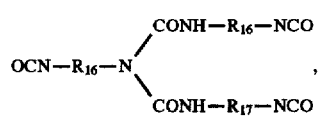

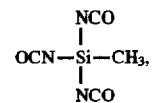

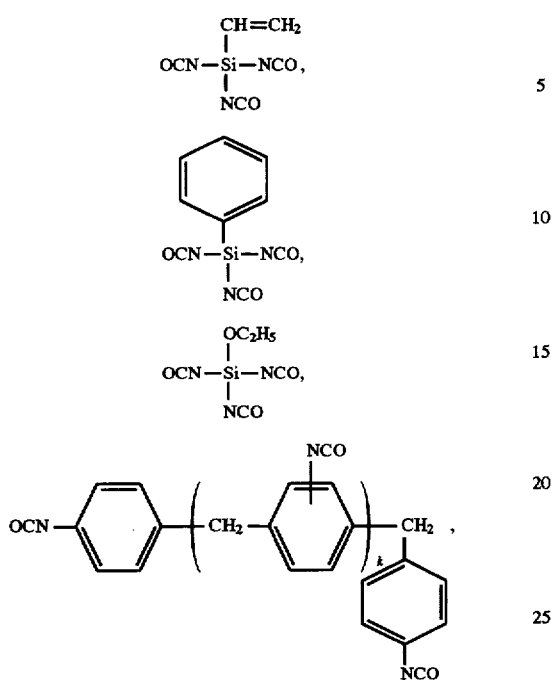

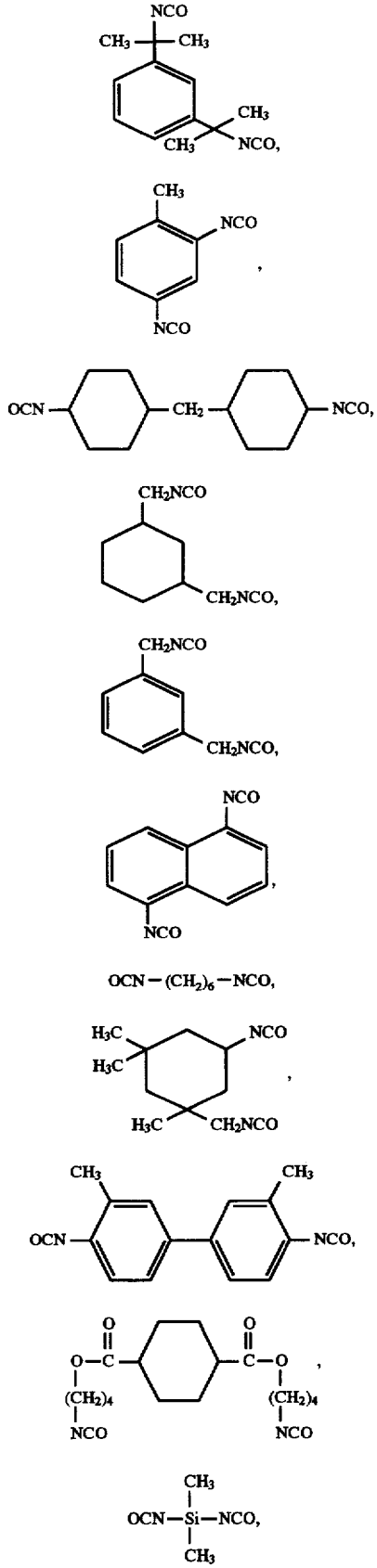

and Si(NCO)$_4$, wherein each of $R_{16}$, $R_{17}$, and $R_{18}$ is independently an alkylene group or a phenylene group and K is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone) titanate, di-n-butoxy bis(triethanolamine)titanate, Zr tetraacetylacetonate, ethyl acetoacetatoaluminum diisopropylate and aluminum tris(ethylacetoacetate).

2. The polymeric optical mixture as claimed in claim 1, wherein said cross-linking agent is a polyisocyanate containing a silicon atom to which at least two of the functional groups of —N=C=O are bonded.

3. A polymeric optical mixture, comprising:
a polysiloxane containing a hydroxyl group therein; and
a cross-linking agent which is capable of cross-linking said polysiloxane and which is selected from the group consisting of
(a) a polyisocyanate selected from the group consisting of compounds of formulae which follow:

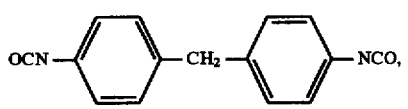

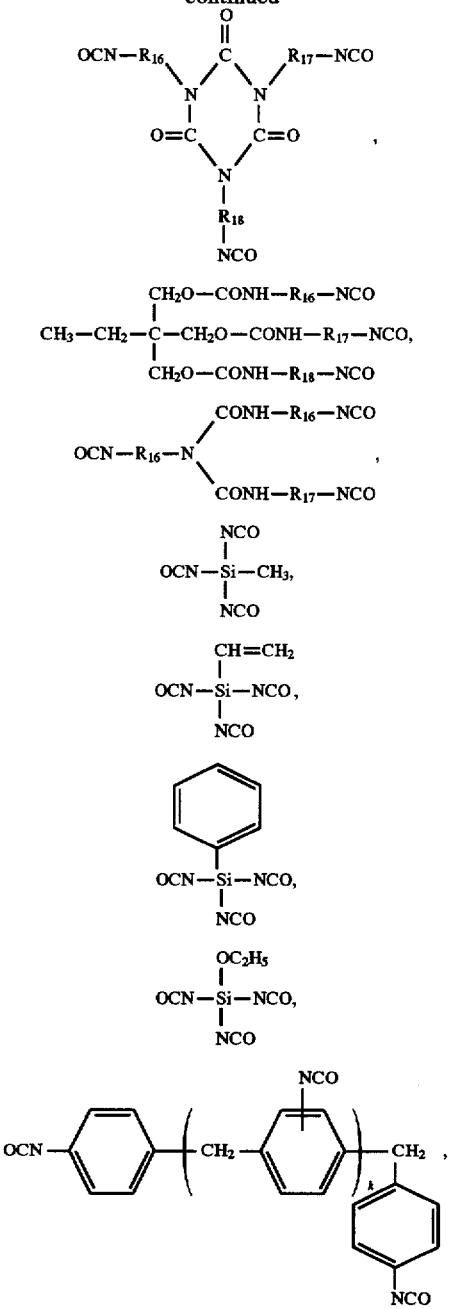

and Si(NCO)₄, wherein each of $R_{16}$, $R_{17}$, and $R_{18}$ is independently an alkylene group or a phenylene group and K is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)₄, Zr(OZ)₄ and Al(OZ)₃, wherein Z is an alkyl or cycloalkyl group; and (d) a chelated compound selected from the group consisting of di-i-propoxy bis(acetylacetone) titanate, di-n-butoxy bis(triethanolamine)titanate, Zr tetraacetylacetonate, ethyl acetoacetatoaluminum diisopropylate and aluminum tris(ethylacetoacetate).

4. The polymeric optical mixture as claimed in claim 3, wherein said cross-linking agent is a polyisocyanate containing a silicon atom to which at least two of the functional groups of —N=C=O are bonded.

5. A polymeric optical mixture, comprising:

a polysiloxane comprising at least one unit selected from the group consisting of units A, B, C and D represented by formulae (II-1) to (II-4), respectively, and at least one unit selected from the group consisting of units E and F represented by formulae (II-5) and (II-6), respectively:

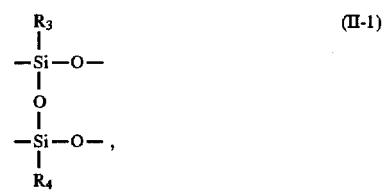 (II-1)

 (II-2)

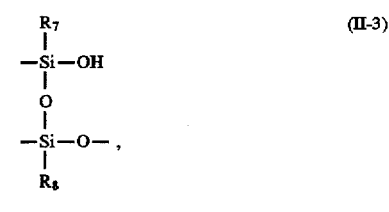 (II-3)

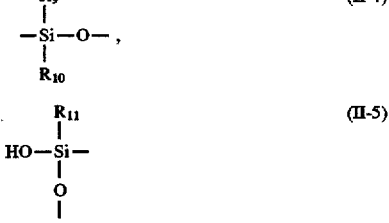 (II-4)

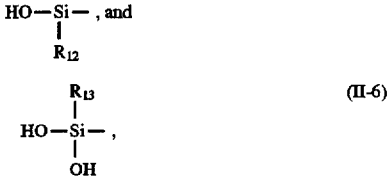 (II-5)

 (II-6)

wherein each of $R_3$ to $R_{13}$ is independently (a) an alkyl, deuterated alkyl or halogenated alkyl group; or (b) a phenyl, deuterated phenyl or halogenated phenyl group; and a cross-linking agent which is capable of cross-linking said polysiloxane and which is selected from the group consisting of (a) a polyisocyanate selected from the group consisting of compounds of formulae which follow:

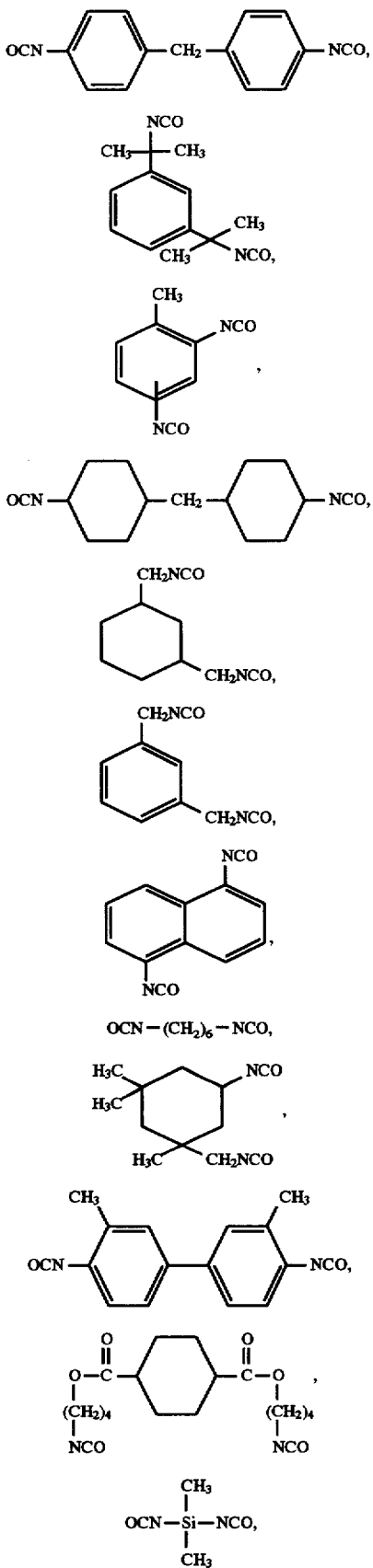
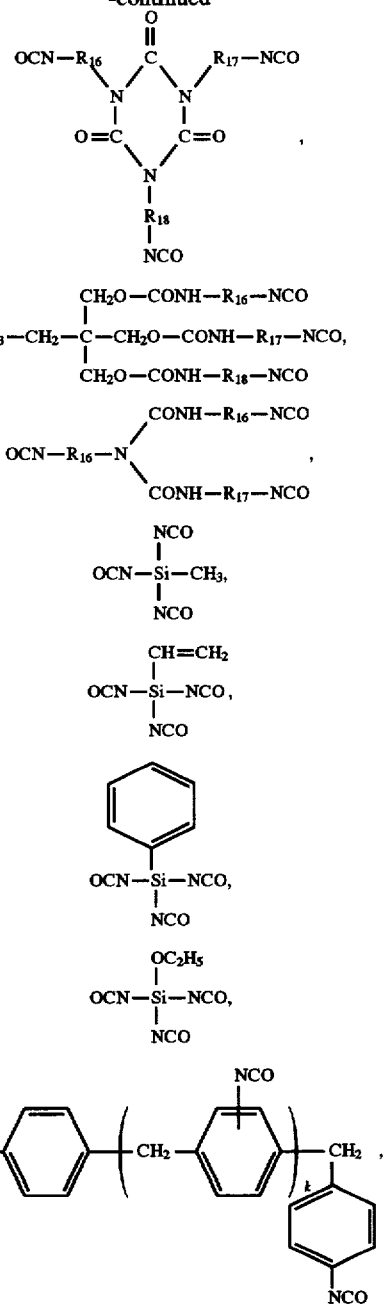

and Si(NCO)$_4$, wherein each of $R_{16}$, $R_{17}$, and $R_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone)

titanate, di-n-butoxy bis(triethanolamine)titanate, Zr tetraacetylacetonate, ethyl acetoacetatoaluminum diisopropylate and aluminum tris(ethylacetoacetate).

6. The polymeric optical mixture as claimed in claim 5, wherein said cross-linking agent is a polyisocyanate containing a silicon atom to which at least two of the functional groups of —N=C=O are bonded.

7. A polymeric optical mixture, comprising:

a polysiloxane comprising a repeating unit represented by formula (III):

wherein each of $R_{14}$ and $R_{15}$ is independently (a) an alkyl, deuterated alkyl or halogenated alkyl group; (b) an alkenyl, deuterated alkenyl or halogenated alkenyl group; or (c) a phenyl, deuterated phenyl or halogenated phenyl group; with the proviso that at least one of $R_{14}$ and $R_{15}$ is the alkyl, deuterated alkyl or halogenated alkyl group or the alkenyl, deuterated alkenyl or halogenated alkenyl group defined above; and an organic peroxide.

8. The polymeric optical mixture as claimed in claim 7, wherein said organic peroxide is a compound selected from the group consisting of a ketone peroxide, a diacyl peroxide, an hydroperoxide, a dialkyl peroxide, a peroxy ketal, an alkyl perester, and a percarbonate.

9. A polymeric optical material which is prepared by cross-linking a polysiloxane comprising a repeating unit represented by formula (I):

wherein each of $R_1$ and $R_2$ is independently (a) an alkyl, deuterated alkyl or halogenated alkyl group; or (b) a phenyl, deuterated phenyl or halogenated phenyl group, with a cross-linking agent which is capable of cross-linking said polysiloxane, and which is selected from the group consisting of (a) a polyisocyanate selected from the group consisting of compounds of formulae which follow:

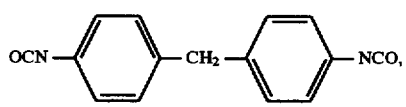

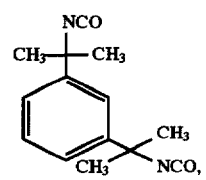

-continued

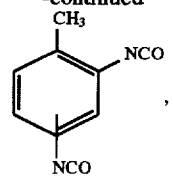

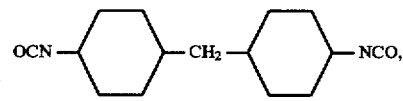

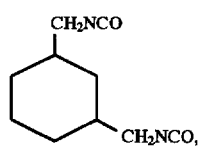

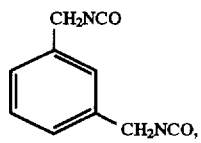

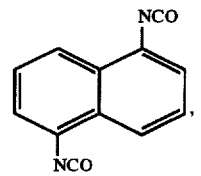

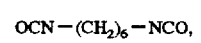

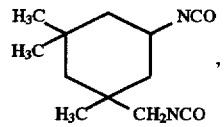

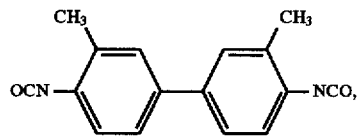

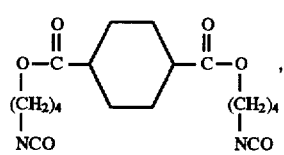

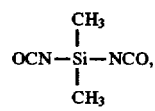

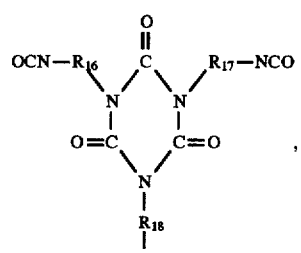

-continued

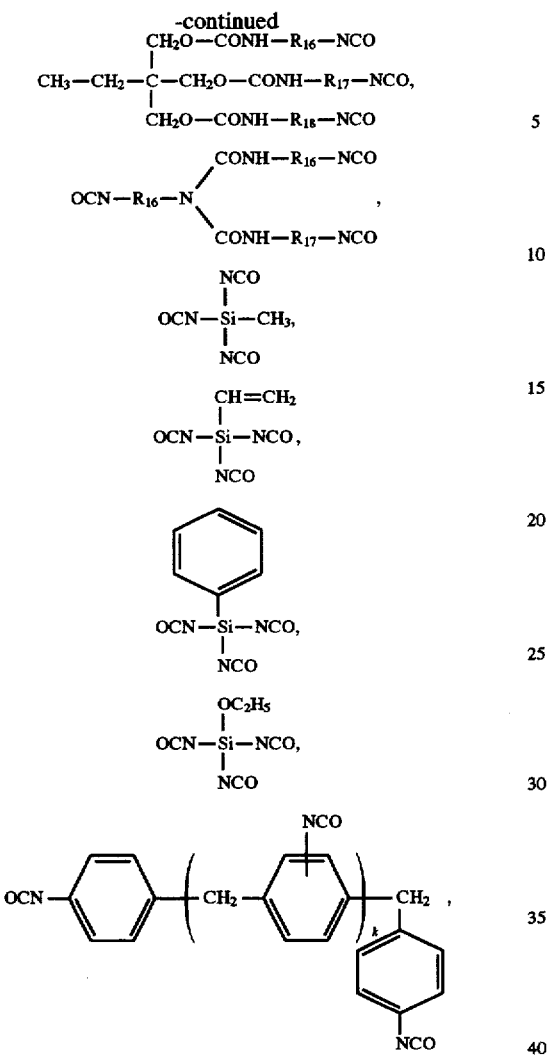

and Si(NCO)$_4$, wherein each of R$_{16}$, R$_{17}$, and R$_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelate compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

10. The polymeric optical material as claimed in claim 9, wherein said cross-linking agent is a polyisocyanate containing a silicon atom to which at least two of the functional groups of —N=C=O are bonded.

11. A polymeric optical material which is prepared by cross-linking a polysiloxane containing a hydroxyl group therein with a cross-linking agent which is capable of cross-linking said polysiloxane, and which is selected from the group consisting of (a) a polyisocyanate selected from the group consisting of compounds of formulae which follow:

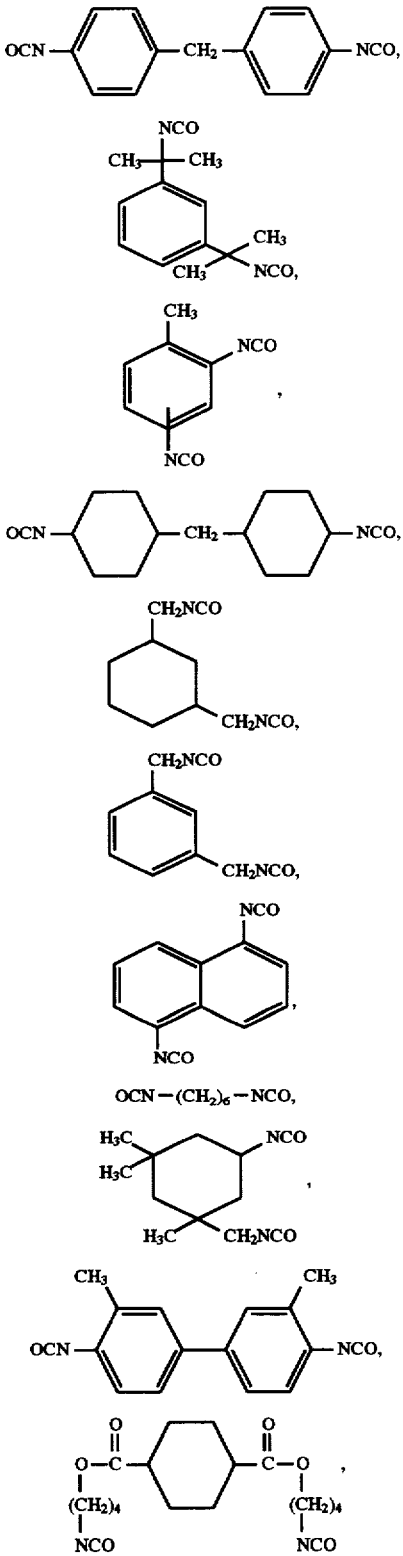

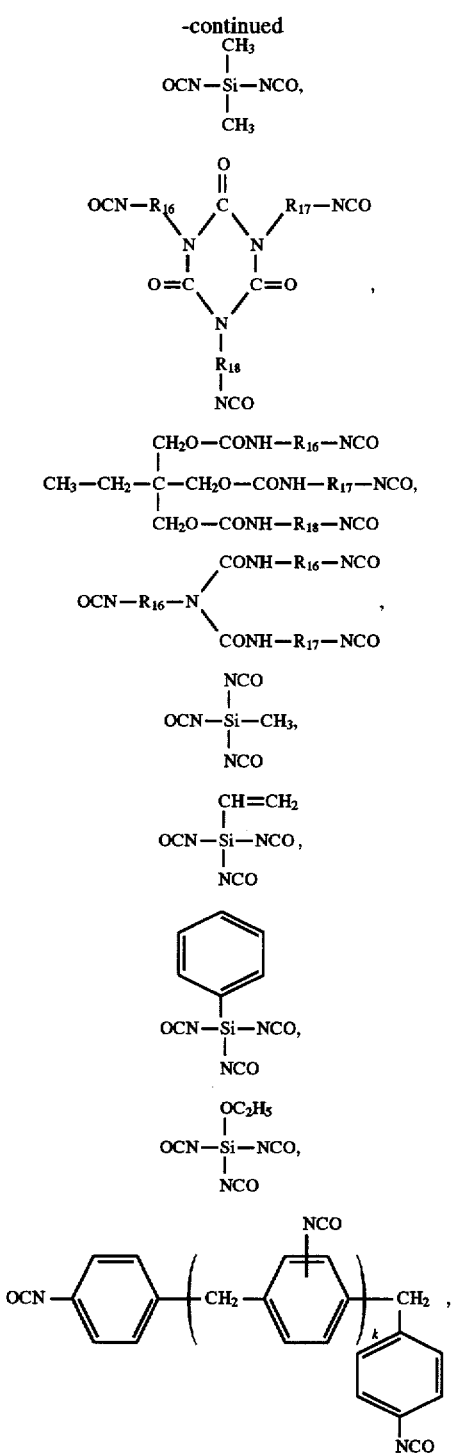

and Si(NCO)₄, wherein each of $R_{16}$, $R_{17}$, and $R_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)₄, Zr(OZ)₄ and Al(OZ)₃, wherein Z is an alkyl or cycloalkyl group; and (d) a chelated compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

12. The polymeric optical material as claimed in claim 11, wherein said cross-linking agent is a polyisocyanate containing a silicon atom to which at least two of the functional groups of —N=C=O are bonded.

13. A polymeric optical material which is prepared by cross-linking a polysiloxane comprising at least one unit selected from the group consisting of units A, B, C and D represented by formulae (II-1) to (II-4), respectively, and at least one unit selected from the group consisting of units E and F represented by formulae (II-5) and (II-6), respectively:

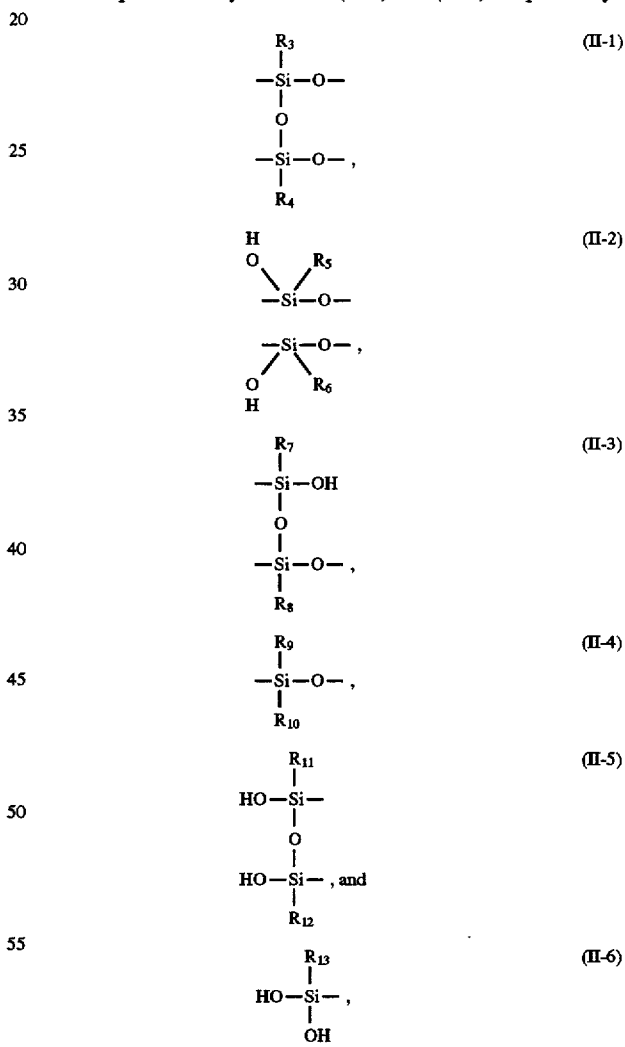

wherein each of $R_3$ to $R_{13}$ is independently (a) an alkyl, deuterated alkyl or halogenated alkyl groups; or (b) a phenyl, deuterated phenyl or halogenated phenyl group, with a cross-linking agent which is capable of cross-linking said polysiloxane, and which cross-linking agent is selected from the group consisting of (a) a polyisocyanate selected from the group consisting of compounds of formulae which follow:

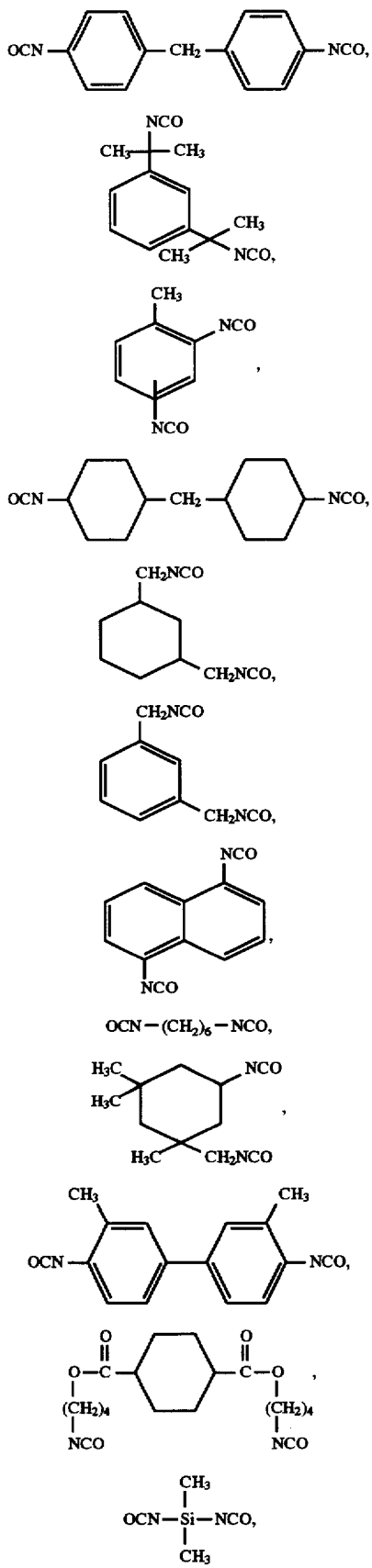

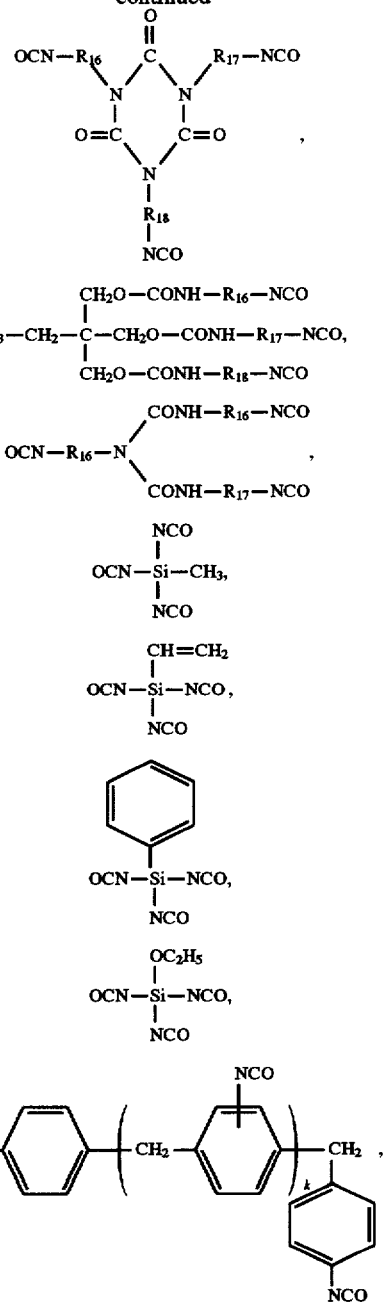

and Si(NCO)$_4$, wherein each of R$_{16}$, R$_{17}$, and R$_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

14. The polymeric optical material as claimed in claim 13, wherein said cross-linking agent is a polyisocyanate containing a silicon atom to which at last two of the functional groups of —N=C=O are bonded.

15. A polymeric optical material which is prepared by cross-linking a polysiloxane comprising a repeating unit represented by formula (III):

wherein each of $R_{14}$ and $R_{15}$ is independently (a) an alkyl, wherein deuterated alkyl or halogenated alkyl group; (b) an alkenyl, deuterated alkenyl or halogenated alkenyl group; or (c) a phenyl, deuterated phenyl or halogenated phenyl group; with the proviso that at least one of $R_{14}$ and $R_{15}$ is the alkyl, deuterated alkyl or halogenated alkyl group or the alkenyl, deuterated alkenyl or halogenated alkenyl group defined above, in the presence of an organic peroxide by means of one of (a) heating or (b) irradiating with light or high energy radiation of α-ray, β-ray, γ-ray, X-ray or synchrotron radiation.

16. The polymeric optical mixture as claimed in claim 15, wherein said organic peroxide is a compound selected from the group consisting of a ketone peroxide, a diacyl peroxide, an hydroperoxide, a dialkyl peroxide, a peroxy ketal, an alkyl perester, and a percarbonate.

17. A polymeric optical waveguide having a core and a cladding surrounding the core, wherein at least one of said core and cladding comprises a polymeric optical material which is prepared by cross-linking a polysiloxane comprising a repeated unit represented by formula (I):

wherein each of $R_1$ and $R_2$ is independently (a) an alkyl, deuterated alkyl or halogenated alkyl group; or (b) a phenyl, deuterated phenyl or halogenated phenyl group, with a cross-linking agent which is capable of cross-linking said polysiloxane, and which cross-linking agent is selected from the group consisting of (a) a polyisocyanate selected from the group consisting of compounds of formulae which follow:

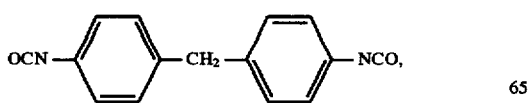

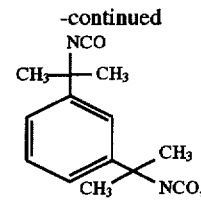

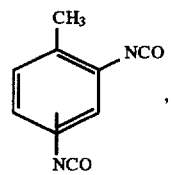

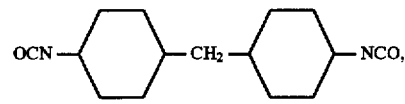

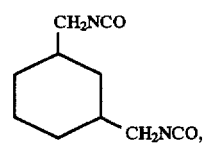

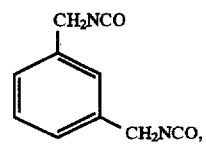

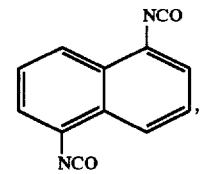

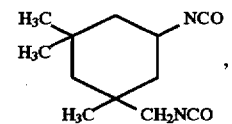

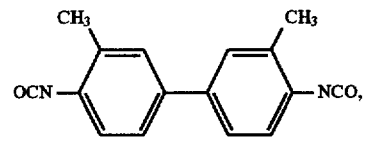

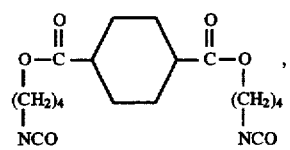

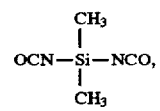

-continued

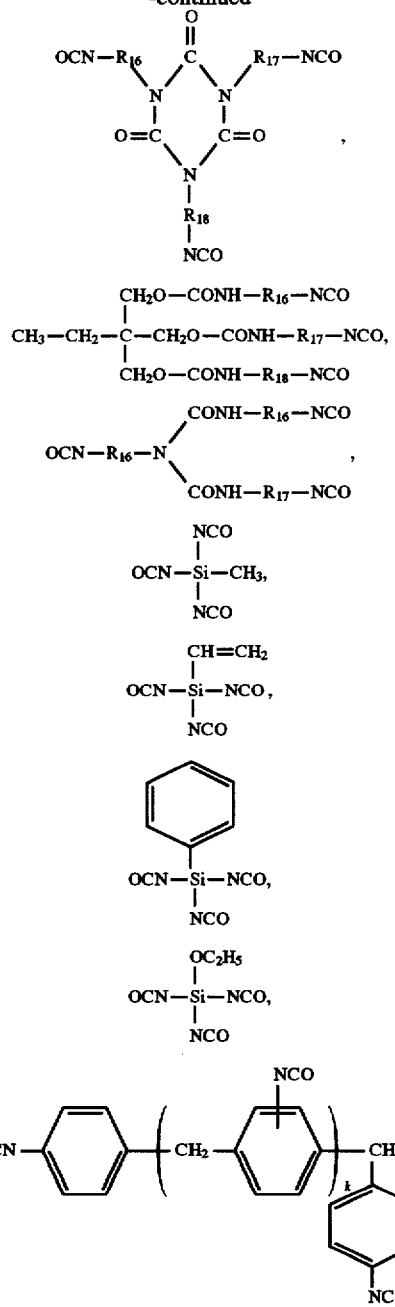

and Si(NCO)$_4$, wherein each of R$_{16}$, R$_{17}$, and R$_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

18. The polymeric optical waveguide as claimed in claim 17, which further comprises a substrate having said cladding thereon.

19. The polymeric optical waveguide as claimed in claim 17, wherein said cross-linking agent is a polyisocyanate containing a silicon atom to which at least two of the functional groups of —N=C=O are bonded.

20. The polymeric optical waveguide as claimed in claim 19, which further comprises a substrate having said cladding thereon.

21. A polymeric optical waveguide having a core and a cladding surrounding the core, wherein, at least one of said core and cladding comprises a polymeric optical material which is prepared by cross-linking a polysiloxane containing a hydroxyl group therein with a cross-linking agent which is capable of cross-linking said polysiloxane, and which cross-linking agent is selected from the group consisting of (a) polyisocyanate selected from the group consisting of compounds of formulae which follow:

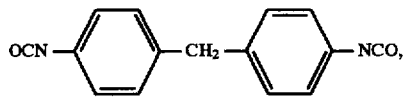

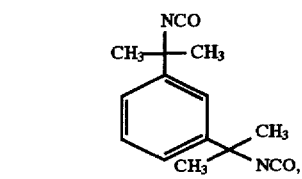

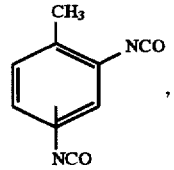

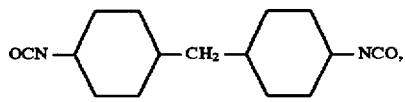

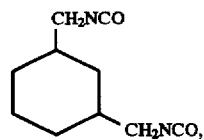

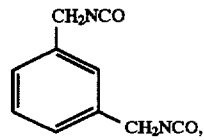

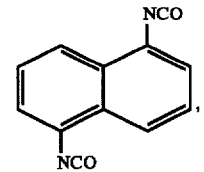

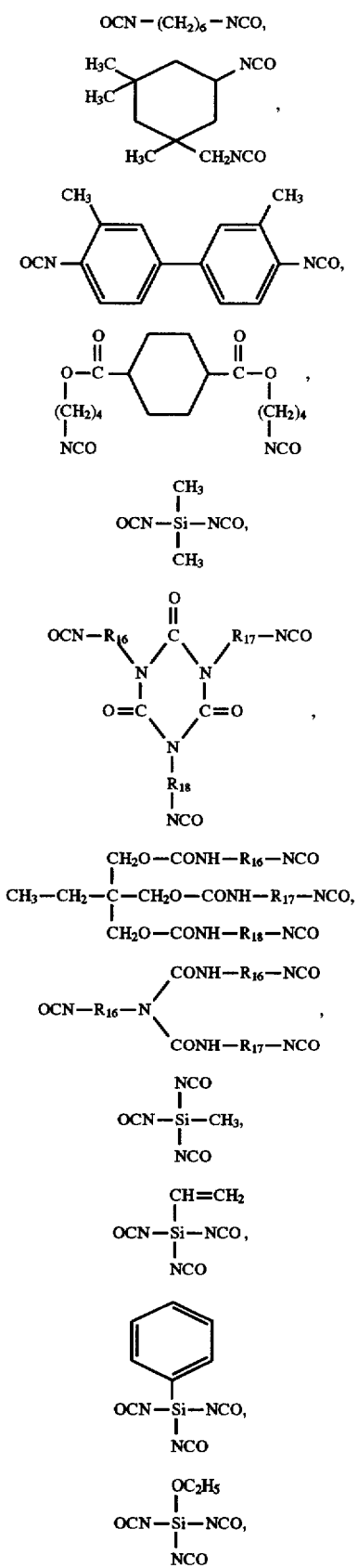

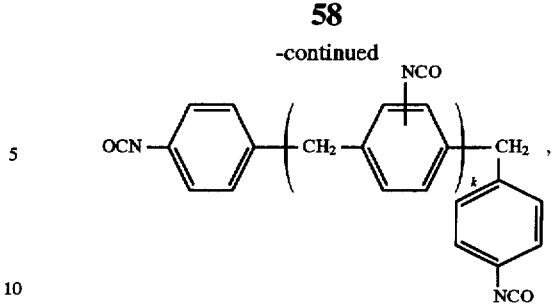

and Si(NCO)$_4$, wherein each of R$_{16}$, R$_{17}$, and R$_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

22. The polymeric optical waveguide as claimed in claim 21, which further comprises a substrate having said cladding thereon.

23. The polymeric optical waveguide as claimed in claim 22, wherein said cross-linking agent is a compound containing a silicon atom to which at least two of the functional groups of —N═C═O are bonded.

24. The polymeric optical waveguide as claimed in claim 23, which further comprises a substrate having said cladding thereon.

25. A polymeric optical waveguide having a core and a cladding surrounding the core, wherein at least one of said core and cladding comprises a polymeric optical material which is prepared by cross-linking a polysiloxane comprising at least one unit selected from the group consisting of units A, B, C and D represented by formulae (II-1) to (II-4), respectively, and at least one unit selected from the group consisting of units E and F represented by formulae (II-5) and (II-6), respectively:

 (II-1)

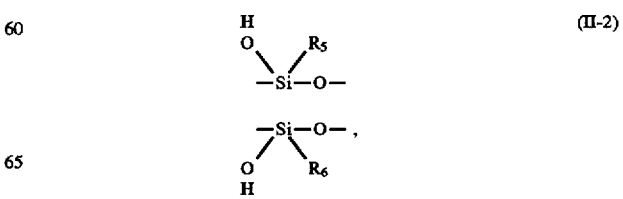 (II-2)

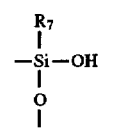 (II-3)

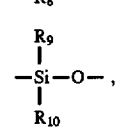 (II-4)

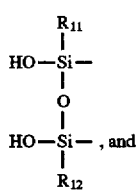 (II-5)

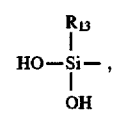 (II-6)

wherein each of $R_3$ to $R_{13}$ is independently (a) an alkyl, deuterated alkyl or halogenated alkyl groups; or (b) a phenyl, deuterated phenyl or halogenated phenyl group, with a cross-linking agent which is capable of cross-linking said polysiloxane, and which cross-linking agent is selected from the group consisting of (a) a polyisocyanate selected from the group consisting of compounds of formulae which follow:

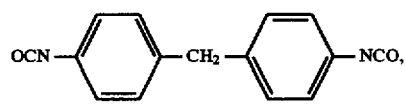

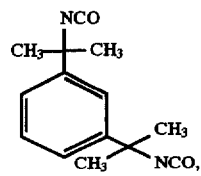

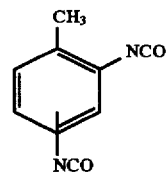

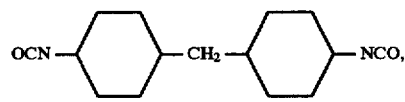

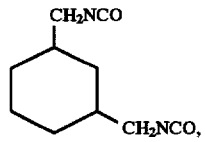

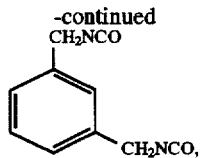

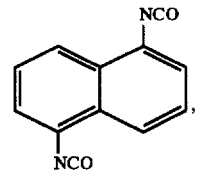

$OCN-(CH_2)_6-NCO,$

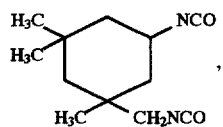

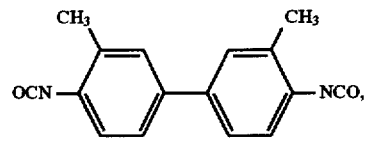

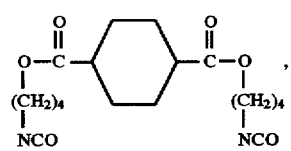

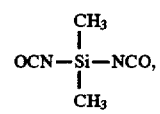

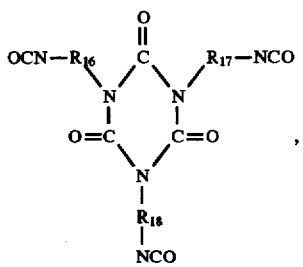

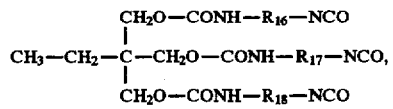

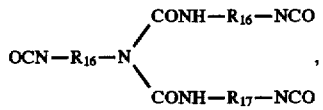

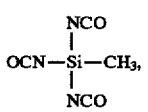

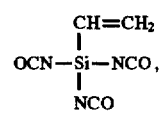

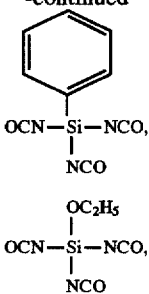

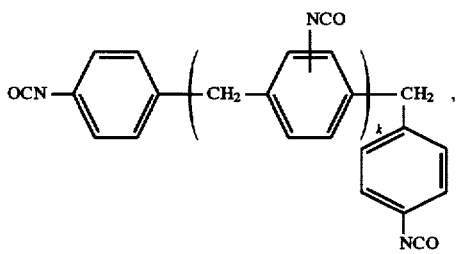

and Si(NCO)$_4$, wherein each of R$_{16}$, R$_{17}$, and R$_{18}$ is independently an alkylene group or a phenylene group and k is a positive integer, and a substituted form of any of the foregoing compounds in which at least one of the hydrogen atoms of the alkylene or phenylene group is substituted by at least one group selected from halogen or deuterium;

(b) a silane compound selected from the group consisting of an acetoxysilane, an alkoxysilane, an ketoximesilane, an aminosilane, an aminoxysilane, an silazane and an amidosilane;

(c) an alkoxide compound selected from the group consisting of compounds represented by Ti(OZ)$_4$, Zr(OZ)$_4$ and Al(OZ)$_3$, wherein Z is an alkyl or cycloalkyl group; and (d) a chelated compound selected from the group consisting of di-i-propoxy bis(acetylacetone)titanate, di-n-butoxy bis(triethanolamine)titanate, Zr tetraacetylacetonate, ethyl acetoacetatoaluminum diisopropylate and aluminum tris(ethylacetoacetate).

26. The polymeric optical waveguide as claimed in claim 25, which further comprises a substrate having said cladding thereon.

27. The polymeric optical waveguide as claimed in claim 25, wherein said cross-linking agent is a polyisocyanate containing a silicon atom to which at least two of the functional groups of —N=C=O are bonded.

28. The polymeric optical waveguide as claimed in claim 27, which further comprises a substrate having said cladding thereon.

29. A polymeric optical waveguide having a core and a cladding surrounding the core, wherein at least one of said core and cladding comprises a polymeric optical material which is prepared by cross-linking a polysiloxane comprising a repeating unit represented by formula (III):

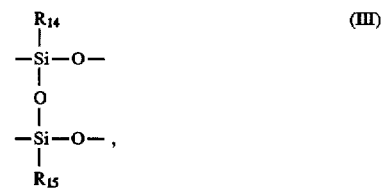

wherein each of R$_{14}$ and R$_{15}$ is independently (a) an alkyl, deuterated alkyl or halogenated alkyl group; (b) an alkenyl, deuterated alkenyl or halogenated alkenyl group; or (a) phenyl, deuterated phenyl or deuterated phenyl group; with the proviso that at least one of R$_{14}$ and R$_{15}$ is the alkyl, deuterated alkyl or halogenated alkyl group or the alkenyl, deuterated alkenyl or halogenated alkenyl group defined above, in the presence of an organic peroxide by means of one of (a) heating or (b) irradiating with light or high energy radiation of α-ray, β-ray, γ-ray, X-ray or synchrotron radiation.

30. The polymeric optical waveguide as claimed in claim 29, which further comprises a substrate having said cladding thereon.

31. The polymeric optical mixture as claimed in claim 29, wherein said organic peroxide is a compound selected from the group consisting of a ketone peroxide, a diacyl peroxide, an hydroperoxide, a dialkyl peroxide, a peroxy ketal, an alkyl perester, and a percarbonate.

32. The polymeric optical waveguide as claimed in claim 31, which further comprises a substrate having said cladding thereon.

* * * * *